(12) United States Patent
Fu

(10) Patent No.: US 10,855,452 B2
(45) Date of Patent: Dec. 1, 2020

(54) METHOD AND SYSTEM FOR DATA SECURITY BASED ON QUANTUM COMMUNICATION AND TRUSTED COMPUTING

(71) Applicant: Alibaba Group Holding Limited, George Town (KY)

(72) Inventor: Yingfang Fu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 197 days.

(21) Appl. No.: 15/716,965

(22) Filed: Sep. 27, 2017

(65) Prior Publication Data

US 2018/0109377 A1    Apr. 19, 2018

(30) Foreign Application Priority Data

Oct. 14, 2016    (CN) .......................... 2016 1 0899985

(51) Int. Cl.
*H04L 9/08* (2006.01)
*H04L 29/06* (2006.01)
*H04L 9/32* (2006.01)

(52) U.S. Cl.
CPC ............ *H04L 9/0838* (2013.01); *H04L 9/083* (2013.01); *H04L 9/085* (2013.01); *H04L 9/0825* (2013.01); *H04L 9/0852* (2013.01); *H04L 9/0855* (2013.01); *H04L 9/0897* (2013.01); *H04L 9/321* (2013.01); *H04L 9/3263* (2013.01); *H04L 63/0435* (2013.01); *H04L 63/061* (2013.01); *H04L 63/0823* (2013.01)

(58) Field of Classification Search
None
See application file for complete search history.

(56) References Cited

U.S. PATENT DOCUMENTS

| 5,307,410 | A | 4/1994 | Bennett |
| 5,675,648 | A | 10/1997 | Townsend |
| 6,505,247 | B1 | 1/2003 | Steger |
| 8,990,550 | B1 * | 3/2015 | Hushon ............... H04L 63/0876 713/2 |

(Continued)

FOREIGN PATENT DOCUMENTS

| EP | 0962070 | 12/1999 |
| WO | 2012098543 | 7/2012 |

(Continued)

OTHER PUBLICATIONS

Barker et al., "Recommendation for Key Management—Part 1: General (Revision 3)", NIST Special Publication 800-57, Jul. 2012 (Year: 2012).*

(Continued)

*Primary Examiner* — Henry Tsang
(74) *Attorney, Agent, or Firm* — Shun Yao; Park, Vaughan, Fleming & Dowler LLP

(57) ABSTRACT

One embodiment described herein provides a system and method for ensuring data and computation security. During operation, a server receives a key-negotiation request from a client and authenticates the client. In response to the client authenticating the server, the server negotiates, via a quantum-key-distribution process, a secret key shared between the client and the server; and stores the secret key in a trusted-computing module.

8 Claims, 14 Drawing Sheets

(56) References Cited

U.S. PATENT DOCUMENTS

| | | |
|---|---|---|
| 9,077,577 B1 | 7/2015 | Ashrafi |
| 9,130,742 B2 | 9/2015 | Yao |
| 9,294,267 B2 | 3/2016 | Kamath |
| 9,323,901 B1 | 4/2016 | Nair |
| 9,698,979 B2 | 7/2017 | Armstrong |
| 9,887,976 B2 | 2/2018 | Hughes |
| 2005/0071677 A1 | 3/2005 | Khanna |
| 2005/0135620 A1 | 6/2005 | Kastella |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1* | 2/2006 | Bade ............... G06F 21/34 726/34 |
| 2006/0056630 A1 | 3/2006 | Zimmer |
| 2007/0016794 A1 | 1/2007 | Harrison |
| 2007/0076889 A1 | 4/2007 | Derobertis |
| 2007/0147292 A1 | 6/2007 | Van Ewijk |
| 2007/0192598 A1 | 8/2007 | Troxel |
| 2008/0114983 A1 | 5/2008 | Sherkin |
| 2008/0123859 A1 | 5/2008 | Mamidwar |
| 2008/0165973 A1 | 7/2008 | Gavillan |
| 2008/0219449 A1 | 9/2008 | Ball |
| 2008/0222734 A1 | 9/2008 | Redlich |
| 2009/0019285 A1* | 1/2009 | Chen ............... G06F 21/575 713/175 |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0204812 A1 | 8/2009 | Baker |
| 2009/0271634 A1 | 10/2009 | Boult |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2011/0069972 A1 | 3/2011 | Wiseman |
| 2011/0099367 A1 | 4/2011 | Thom |
| 2011/0126011 A1 | 5/2011 | Choi |
| 2011/0167503 A1 | 7/2011 | Horal |
| 2011/0209202 A1 | 8/2011 | Otranen |
| 2011/0213979 A1 | 9/2011 | Wiseman |
| 2011/0231615 A1 | 9/2011 | Ober |
| 2012/0045002 A1 | 2/2012 | Zivkovic |
| 2012/0084570 A1* | 4/2012 | Kuzin ............... G06F 21/41 713/182 |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1* | 4/2013 | Hughes ............... H04L 9/0836 380/278 |
| 2013/0101119 A1 | 4/2013 | Nordholt |
| 2013/0208894 A1 | 8/2013 | Bovino |
| 2013/0227286 A1 | 8/2013 | Brisson |
| 2013/0246641 A1 | 9/2013 | Vimpari |
| 2013/0251145 A1 | 9/2013 | Lowans |
| 2013/0315395 A1 | 11/2013 | Jacobs |
| 2014/0068765 A1 | 3/2014 | Choi |
| 2014/0141725 A1 | 5/2014 | Jesme |
| 2014/0237565 A1 | 8/2014 | Fleysher |
| 2014/0259138 A1 | 9/2014 | Fu |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0095987 A1 | 4/2015 | Potash |
| 2015/0181308 A1 | 6/2015 | Ducharme |
| 2015/0207926 A1 | 7/2015 | Brown |
| 2015/0222619 A1 | 8/2015 | Hughes |
| 2015/0236852 A1 | 8/2015 | Tanizawa |
| 2015/0271147 A1 | 9/2015 | Tanizawa |
| 2015/0288517 A1 | 10/2015 | Evans |
| 2015/0288542 A1 | 10/2015 | Ashrafi |
| 2015/0309924 A1 | 10/2015 | Chen |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0021068 A1 | 1/2016 | Jueneman |
| 2016/0080708 A1 | 3/2016 | Urata |
| 2016/0087946 A1 | 3/2016 | Yang |
| 2016/0105439 A1 | 4/2016 | Hunt |
| 2016/0210105 A1 | 7/2016 | Ru |
| 2016/0226846 A1* | 8/2016 | Fu ............... H04L 63/062 |
| 2016/0241396 A1 | 8/2016 | Fu |
| 2016/0248581 A1* | 8/2016 | Fu ............... H04L 9/0855 |
| 2016/0294783 A1 | 10/2016 | Piqueras Jover |
| 2016/0337329 A1 | 11/2016 | Sood |
| 2016/0359839 A1 | 12/2016 | Natividad |
| 2017/0034167 A1 | 2/2017 | Figueira |
| 2017/0104588 A1* | 4/2017 | Camenisch ............ H04L 9/085 |
| 2017/0230173 A1 | 8/2017 | Choi |
| 2017/0302448 A1 | 10/2017 | Luk |
| 2017/0324730 A1 | 11/2017 | Otranen |
| 2018/0048466 A1 | 2/2018 | Chen |
| 2018/0063709 A1 | 3/2018 | Morrison |

FOREIGN PATENT DOCUMENTS

| | | |
|---|---|---|
| WO | 2013026086 | 2/2013 |
| WO | 2016070141 | 5/2016 |

OTHER PUBLICATIONS

Tien-Sheng Lin, et al., Quantulm Aulthentication and Secure Communication Protocols, 2006 IEEE (Year:2006).

Charles H. Bennett et al., Quantum cryptography: Public key distribution and coin tossing, www. elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998, IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authentication Quantum Secure Direct Communication with Qutrits, Fourth International Conference on Natural Computation, IEEE 2008.

Mark Hillery et al. "Quantum Secret Sharing", American Physical Society 1999.

J G Rarity et al. "Ground to satellite secure key exchange using quantum cryptography", New Journal of Physics 2002.

Richard J Hughes et al. "Practical free-space quantum key distribution over 10 km in daylight and at night", New Journal of Physics 2002.

* cited by examiner

METHOD AND SYSTEM FOR DATA SECURITY BASED ON QUANTUM COMMUNICATION AND TRUSTED COMPUTING

RELATED APPLICATION

Under 35 U.S.C. § 119, this application claims the benefit and right of priority of Chinese Patent Application No. 201610899985.5, filed on 14 Oct. 2016.

BACKGROUND

Field

This disclosure is generally related to data security. More specifically, this disclosure is related to a system and method for ensuring data security based on quantum communication and trusted computing technologies.

Related Art

In recent years, cloud computing has become a highly demanded service or utility due to the advantages of high computing power, cheap cost of services, high performance, scalability, accessibility as well as availability. In cloud computing, different services, including servers, storage, and application, can be delivered by the service provider to a customer's computers and devices via the Internet. More specifically, cloud computing allows users, and enterprises, with various computing capabilities to store and process data in either a privately owned cloud, or on a third-party server located in a data center in order to make data accessing mechanisms more efficient and reliable. However, security is a huge concern for cloud users. Conventional data security approaches cannot meet the unique security requirements of cloud computing.

SUMMARY

One embodiment described herein provides a system and method for ensuring data and computation security. During operation, a server receives a key-negotiation request from a client and authenticates the client. In response to mutual authentication between the client and the server, the server negotiates, via a quantum-key-distribution process, a secret key shared between the client and the server; and stores the secret key in a trusted-computing module.

In a variation on this embodiment, the server communicates with the client using the secret key as an encryption key. Communicating with the client further comprises sending a message that includes trustworthiness information obtained from the trusted-computing module to the client.

In a variation on this embodiment, the trusted-computing module is a Trusted Platform Module (TPM) or a Trusted Platform Control Module (TPCM).

In a variation on this embodiment, the trustworthiness information includes values of platform configuration registers (PCRs).

In a variation on this embodiment, the server generates a server-specific private key based on a set of subkeys received from a trusted authorization center and information associated with the trusted-computing module.

In a further variation, the information associated with the trusted-computing module comprises a unique identifier and values of platform configuration registers (PCRs) of the trusted-computing module.

In a further variation, the trusted authorization center comprises a set of control nodes that share a private key associated with the trusted authorization center using a secret-sharing scheme, and a respective control node is configured to store a share of the private key associated with the trusted authorization center.

In a further variation, the server sends an initialization request to a subset of the set of control nodes; and in response to the initialization request, receives from a control node a subkey, which is generated by the control node based on identity information associated with the server, information associated with the trusted-computing module, and a share of the private key stored in the control node.

In a further variation, the server establishes a secure communication channel between the server and the trusted authorization center using a quantum key distribution process.

In a further variation, the server further generates a trusted certificate based on the server-specific private key and sends the trusted certificate to the client to allow the client to authenticate the server.

In a variation on this embodiment, authenticating the client comprises authenticating a trusted certificate and a trusted measurement report included in the key-negotiation request.

One embodiment described herein provides a system and method for ensuring data and computation security. During operation, a client sends a key-negotiation request to a server and received a key-negotiation response. The client authenticates the server based on the key-negotiation response. The client negotiates, via a quantum-key-distribution process, a secret key shared between the client and the server; and stores the secret key in a trusted-computing module. The client communicates with the server using the secret key as an encryption key. Communicating with the server further comprises sending a message that includes trustworthiness information obtained from the trusted-computing module to the server.

One embodiment described herein provides a system and method for receiving a trusted certificate. During operation, an entity in a cloud computing environment sends a certificate request to a trusted authorization center, which comprises a set of control nodes that share, using a secret-sharing scheme, a private key associated with the cloud computing environment. Each control node is configured to store a share of the private key, and the certificate request is sent to a subset of control nodes within the set of control nodes. The entity receives, from the subset of control nodes, a set of subkeys. A respective subkey is generated by a control node within the subset based on identity information associated with the entity, trusted-computing platform information associated with the entity, and a share of the private key stored in the control node within the subset. The entity generates an entity-specific private key based on the received set of subkeys and derives a trusted certificate from the entity-specific private key.

Figure 1:
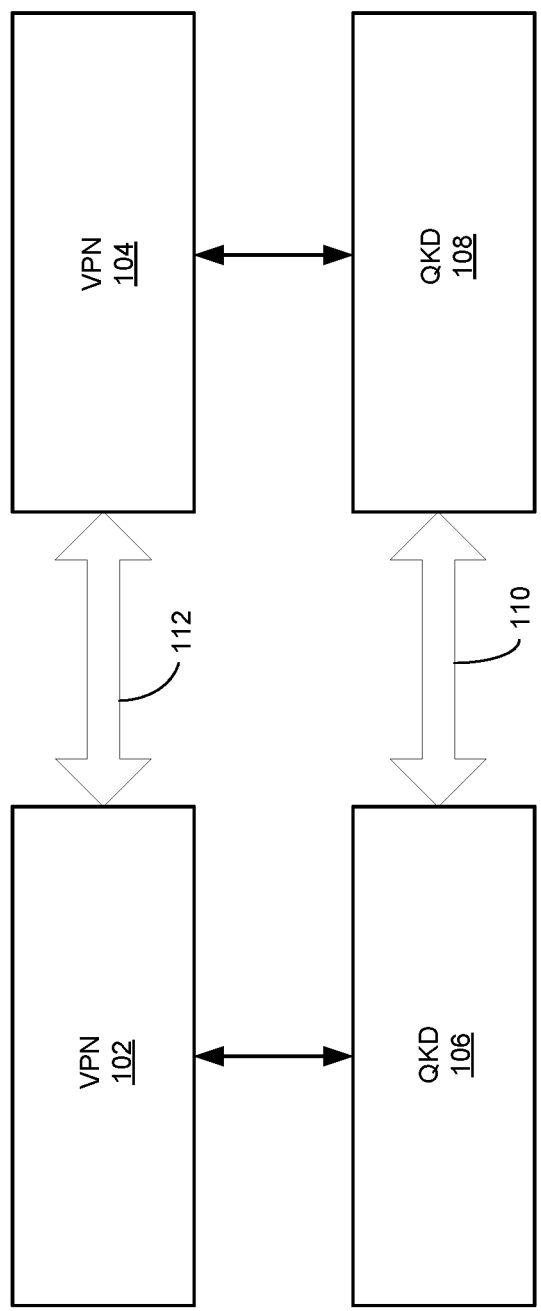
FIG. 1 shows quantum-key-enhanced secure communications between virtual private networks (VPNs), according to one embodiment.

Table 1 shows the mechanical quantity measurement using a set of quantum states.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, a method and system for providing data and computation security in cloud computing is provided. More specifically, a novel cloud security architecture that implements both quantum encryption and trusted computing technologies is provided. To enable trusted computing, the cloud service provider can implement a trusted authorization center, which includes a number of trusted cloud controllers. A trusted cloud controller is a trusted-computing-enabled cloud controller, and can include a Trusted Computing Platform (TCP), which can be based on Trusted Platform Module (TPM) or a Trusted Platform Control Module (TPCM). These trusted cloud controllers can obtain and share, via a quantum key distribution mechanism, a cloud private key, which is generated by the TCP of a particular controller. More specifically, these trusted cloud controllers share the cloud secret key using a secret sharing scheme, with each trusted cloud controller receiving a share of this TCP-generated cloud private key. During initialization, a cloud server can send an authorization request to a subset of the trusted cloud controllers and receive a set of subkeys. Each subkey is constructed based on a share of the cloud private key and identity and platform information of the requesting cloud server. The cloud server can then generate its own server-specific private key based on the received set of subkeys.

To ensure safety of the keys, the subkeys can be encrypted using a quantum key obtained via a quantum key distribution (QKD) process before being sent to the cloud server. The cloud server can decrypt the subkeys, generate and save the server-specific private key into its own TCP and generates a certificate based on the private key. Similarly, a trusted-computing enabled cloud client can also obtain, from the trusted authorization center, its own private key and trusted certificate. The server and client can then authenticate each other based on the trusted certificates. To establish a secure communication channel, the server and client can negotiate, using a quantum key exchange mechanism, one or more shared keys. The shared key or keys can be saved into the TCPs of the cloud client and the cloud server. The cloud client and server can communicate with each other using the shared key or keys. Moreover, messages exchanged between the client and server need to carry the platform configuration register (PCR) values encrypted with a shared key to ensure the integrity of the client and server during transmission.

Quantum key distribution mechanisms can ensure the secrecy of the keys, thus ensuring the security of data transmission. Trusted computing can be used for authentication of the client and server and for ensuring the integrity of the client and server. The combination of quantum key distribution and trusted computing can enhance security in a cloud computing environment.

In this disclosure, an entity is also referred to as a trusted entity (e.g., a trusted server or a trusted client) if the entity is equipped with modules that can enable trusted computing. Without specifying, it is assumed that all entities are trusted-computing enabled.

Principles of Quantum Key Distribution

According to quantum physics, some physical quantities of the microscopic world cannot continuously change but take on certain discrete values, and the difference between two adjacent discrete values is referred to as a "quantum," e.g., a photon is a single quantum of light.

In traditional communication where laws of classical mechanics apply, digital information can be represented as bits, wherein each bit can have two states: e.g., "0s" and "1s," or "high" and "low" voltages. In contrast, in quantum communication where laws of classical mechanics do not apply, information is typically represented as quantum bits (qubits), which are units of quantum information. Each qubit can have two basic states: $|0\rangle$ or $\leftrightarrow$ and $|1\rangle$ or $\updownarrow$. In this case, the two quantum states $|0\rangle$ and $|1\rangle$ form a quantum state basis, which can be expressed as $\{|0\rangle, |1\rangle\}$.

Moreover, a quantum quantity can also take on a mixed state obtained by the superposition of the two basic states with coefficients $\alpha$, $\beta$, respectively. For example, if quantum basis $\{|0\rangle, |1\rangle\}$ is used, then a mixed state can be expressed as:

$$|\varphi\rangle = \alpha|0\rangle + \beta|1\rangle.$$

For example, mixed quantum state basis $\{|+\rangle, |-\rangle\}$ can be generated by superpositioning the basic quantum states $|0\rangle/\leftrightarrow$ and $|1\rangle/\updownarrow$ using the following formulae:

$$|+\rangle = \frac{\leftrightarrow + \updownarrow}{\sqrt{2}},$$

$$|-\rangle = \frac{\leftrightarrow - \updownarrow}{\sqrt{2}}.$$

Note that in the above two bases of quantum state representations, states $|0\rangle$ and $|1\rangle$ are orthogonal to each other, while states $|+\rangle$ and $|-\rangle$ are orthogonal to each other.

In quantum mechanics, a given mechanical quantity can be measured using the above-described quantum states, which are also referred to as "measurement basis." For example, each mechanical quantity can be expressed by a Hermitian operator (or Hermitian matrix). When measuring such a mechanical quantity, the measurement results correspond to the eigenvalues (or the "characteristic values") of the Hermitian operator for this mechanical quantity. After the measurement, the quantum state being measured collapses to the eigenstates (or the "eigenvectors") corresponding to the obtained eigenvalues. Table 1 illustrates two exemplary mechanical quantity measurement schemes based on using two different sets of quantum states in accordance with one embodiment described herein.

TABLE 1

Mechanical Quantity Measurement Using a Set of Quantum States

| Mechanical Quantity | | |
|---|---|---|
| $Z = \begin{pmatrix} 1 & 0 \\ 0 & -1 \end{pmatrix}$ | Eigenvalues: 1, −1<br>Eigenstates: $\|0\rangle, \|1\rangle$ | Referred to as measuring using set $\{\|0\rangle, \|1\rangle\}$ |

| Mechanical Quantity | | |
|---|---|---|
| $Z = \begin{pmatrix} 0 & 1 \\ 1 & 0 \end{pmatrix}$ | Eigenvalues: 1, 1<br>Eigenstates: $\|+\rangle, \|-\rangle$ | Referred to as measuring using set $\{\|+\rangle, \|-\rangle\}$ |

For example, when using quantum state basis $\{|0\rangle, |1\rangle\}$ to measure quantum state $|\varphi\rangle = \alpha|0\rangle + \beta|1\rangle$, wherein $|\alpha|^2 + |\beta|^2 = 1$, we will obtain a measurement value of 1 with a probability of $|\alpha|^2$, wherein after the measurement the quantum state collapses to $|0\rangle$; and we will obtain a measurement value of −1 with a probability of $|\beta|^2$, wherein after the measurement the quantum state collapses to $|1\rangle$.

As another example, when using quantum state basis $\{|0\rangle, |1\rangle\}$ to measure quantum state $|0\rangle$, we will obtain state $|0\rangle$ with probability 1. Similarly, when using quantum state basis $\{|+\rangle, |-\rangle\}$ to measure quantum state $|+\rangle$, we will obtain state $|+\rangle$ with probability 1.

Furthermore, when using quantum state basis $\{|0\rangle, |1\rangle\}$ to measure quantum state $|+\rangle$, we will randomly obtain either state $|0\rangle$ or state $|1\rangle$. Similarly, when using quantum state basis $\{|+\rangle, |-\rangle\}$ to measure state $|0\rangle$, we will randomly obtain either state $|+\rangle$ or state $|-\rangle$.

Bennett-Brassard-84 (BB84) is a popular quantum key distribution protocol. BB84 uses the polarization states of single photons to transmit information. The usual polarization state pairs used are either the rectilinear basis of vertical (0°) and horizontal (90°), the diagonal basis of 45° and 135° or the circular basis of left- and right-handedness. Any two of these bases are conjugate to each other, so any two can be used in the protocol. In the BB84 scheme, sender Alice wishes to send a private key (e.g., a random string) to receiver Bob. Alice starts by generating a random bit and randomly selects from two quantum bases a quantum basis to encode the binary bit. Alice then transmits a single photon in the state specified to Bob, using the quantum channel. This process is then repeated from the random bit stage, with Alice recording the state, basis and time of each photon sent. Upon receiving a photon, Bob performs measurements using randomly selected basis. Bob does this for each photon he receives, recording the time, measurement basis used, and measurement result. After Bob has measured all the photons, he communicates with Alice over the public classical channel. Alice broadcasts the basis each photon was sent in, and Bob the basis each was measured in. They both discard photon measurements (bits) where Bob used a different basis, which is half on average, leaving half the bits as a shared key.

To check for the presence of an eavesdropper Eve, Alice and Bob can compare a predetermined subset of their remaining bit strings. If a third party has gained any information about the photons' polarization, this introduces errors into Bob's measurements. Other environmental conditions can cause errors in a similar fashion. If the bit error rate is less than a predetermined threshold, error-correction techniques can be used to correct errors, and privacy amplification can be used to reduce Eve's knowledge of the key to an arbitrarily small amount at the cost of reducing the length of the key. If the bit error rate is greater than a predetermined threshold, they abort the key and try again, possibly with a different quantum channel, as the security of the key cannot be guaranteed.

Quantum-Key Enhanced Hardware Security Modules

A typical cloud computing environment can be composed of different location systems and include members from multiple environments, thus complicating the security requirements. In cloud computing, security responsibility is shared between cloud providers and users of the cloud services. Cloud providers need to ensure that their infrastructure is secure and users need to use strong passwords and authentication measures. Cloud security needs to include not only data storage and transmission security, but also measures that can verify the identity and status of communication partners (e.g., cloud nodes, services, components) within the cloud platform. In addition, when the cloud platform is communicating with external nodes (e.g., client nodes), security measures are needed for authentication and status verification purposes.

Conventional security measures used by many financial service providers often rely on computational complexity (e.g., strong encryption methods) to ensure security. However, recent development of advanced quantum computing or cloud computing technologies can have the potential for solving problems that were believed to be computationally infeasible with ordinary computers, thus making conventional data encryption techniques less secure. For example, Shor's algorithm has shown the ability to break public-key cryptography schemes (e.g., RSA), and Grover's algorithm has significantly reduced the amount of computation used to brute-force symmetric cryptographic keys.

Certain advanced cryptographic technologies can be applied into cloud computing to increase the data security, including the use of hardware security modules (HSMs). An HSM is a hardware appliance that provides secure key storage and cryptographic operations within a tamper-resistant hardware device. HSMs are designed to securely store cryptographic key material and use the key material without exposing it outside the cryptographic boundary of the appliance. Typical HSMs can come in the form of a plug-in card or an external device that attaches directly to a computer or network server.

In a cloud computing setting, a customer (e.g., an enterprise user) can rely on cloud-HSMs, which can include dedicated HSM appliances owned by the customer but co-located in the cloud, for various security applications, including database encryption, Digital Rights Management (DRM), Public Key Infrastructure (PKI), authentication and authorization, document signing, and transaction processing. The front-end application programming interface (API) of the cloud-HSM can provide a development interface that allows users to integrate the cloud-HSMs with their business applications. A typical front-end API of the cloud-HSM can be provided in the form of the C standard library and can support a standard interface such as PKCS #11, Bsafe, CDSA, etc.

Although HSMs can provide a higher level of security than software-based systems by generating and safeguarding the keys using hardware components, they cannot guarantee tamper-free key distribution. To further enhance security, cloud-HSMs may implement a quantum key distribution mechanism. More superficially, a quantum-key-based HSM can include a quantum key injection module that can couple, via various types of interface (e.g., a network interface, a universal serial bus (USB) interface, or a console interface), to quantum key distribution equipment to obtain quantum keys. FIG. 1 shows quantum-key-enhanced secure communications between virtual private networks (VPNs), according to one embodiment. In FIG. 1, each of the VPNs (VPN 102 and VPN 104) is coupled to a quantum-key-distribution (QKD) module. For example, VPN 102 is coupled to QKD 106 and VPN 104 is coupled to QKD 108. QKD modules 106 and 108 can couple to each other via a quantum channel 110. VPNs 102 and 104 are coupled to each other via a classical or conventional communication channel 112. QKD modules 106 and 108 can facilitate quantum key exchanges, and the HSMs of VPNs 102 and 104 can each obtain and maintain the negotiated quantum key from the corresponding QKD module. Using the quantum key, VPNs 102 and 104 can communicate with each other in a secure manner.

Although the quantum-key-enhanced HSMs can provide a certain level of security for cloud computing, this security solution alone does not provide dynamic monitoring or measurement of user behaviors as well as the running environment of a computation node (e.g., a cloud node or a client machine). Because the integrity of the platforms of the end-to-end users and the validity of the users' identities cannot be guaranteed, one cannot guarantee security of the users' data.

Trusted Computing

Trusted Computing is an emerging technology developed by the Trusted Computing Group (TCG) toward building trustworthy computer platforms. With Trusted Computing, the computer will consistently behave in expected ways, and those behaviors will be enforced by computer hardware and software. Enforcing this behavior is achieved by loading the hardware with a unique encryption key inaccessible to the rest of the system. According to the TCG, "[[a]] trusted component, operation, or process is one whose behavior is predictable under almost any operating condition and which is highly resistant to subversion by application software, viruses, and a given level of physical interference."

The core of trusted computing is the root of trust and the chain of trust. In trusted computing, the root of trust can be factory-installed hardware or firmware, such as the Trusted Platform Module (TPM). A TPM can be implemented as dedicated, cost-effective crypto-chips. A TPM can be physically connected to the computation platform and coupled to the CPU (central processing unit) via external buses. For example, the TPM on a personal computer (PC) can be mounted onto the main board of the PC and connected via a Low Pin Count (LPC) bus. In addition to storing the information for authenticating the platform, a TPM can also be used to store platform measurements that help ensure that the platform remains trustworthy. Authentication (ensuring that the platform can prove that it is what it claims to be) and attestation (a process helping to prove that a platform is trustworthy and has not been breached) are necessary steps to ensure safer computing in all environments.

The chain of trust is the iterative means to extend the boundary from the root of trust. The trustworthiness of a currently running component is based on the trustworthiness of a previously running component. Starting from the root of trust (also known as the trust anchor), if each time the computational environment of the platform changes (e.g., the running of certain codes), the trust can be maintained, thus establishing a reliable chain of trust, the platform can be viewed as trustworthy by local and remote entities.

Figure 2:
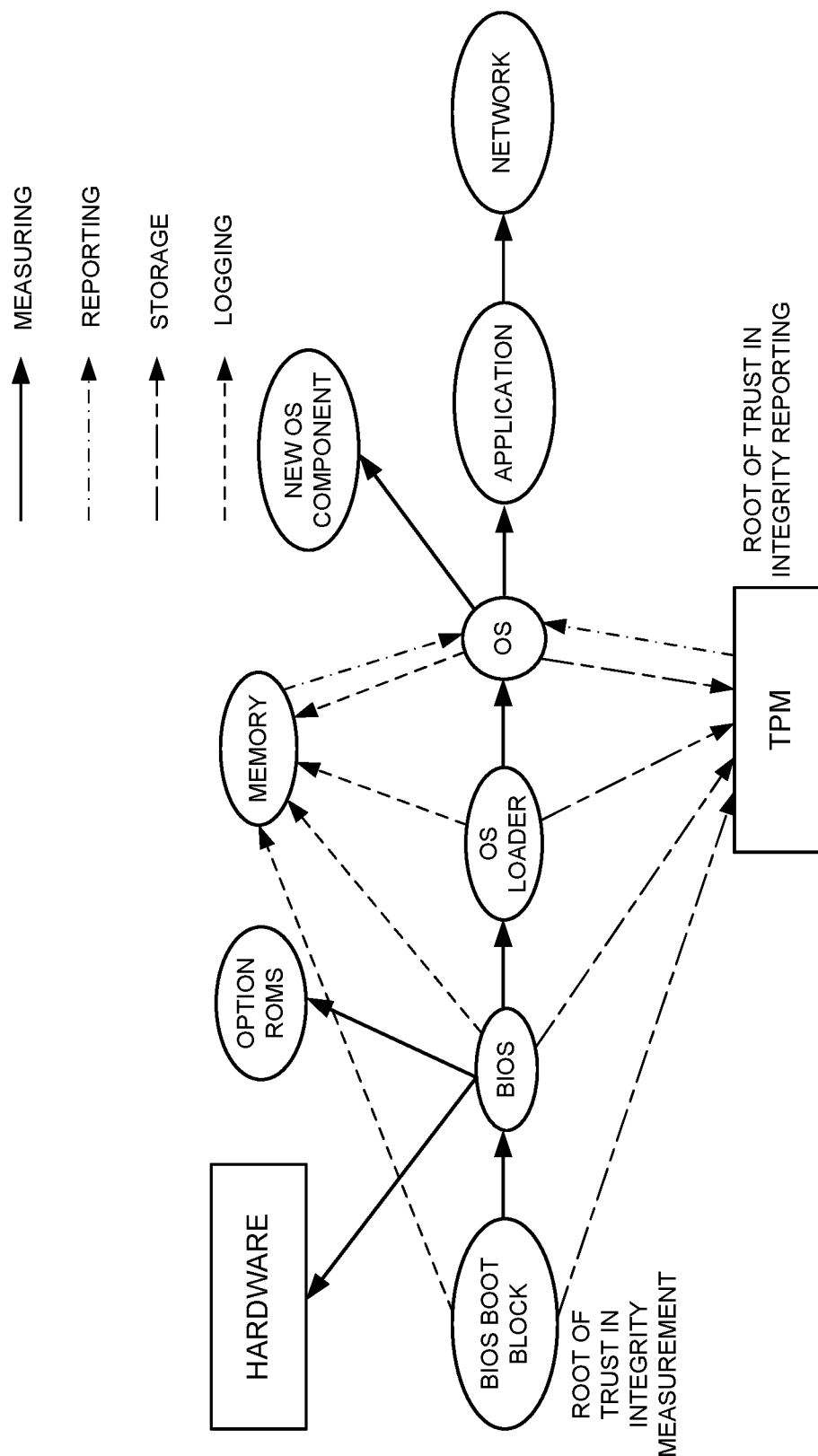
FIG. 2 illustrates the chain of trust in a PC as defined by the Trusted Computing Group.

Trusted computing technologies can include trusted measurement, trusted reporting, trusted storage, and trusted networking. FIG. 2 illustrates the chain of trust in a PC as defined by the Trusted Computing Group. More specifically, FIG. 2 shows the chain of trust for measurement, reporting, storage, and logging.

In addition to TPMs, Trusted Platform Control Modules (TPCMs) have also been developed. TPM was a subordinate device and the root of trusted measurement was put into BIOS (as shown in FIG. 2), which faces the threat of being tampered with. TPCM incorporates into the module the root of trusted measurement, thus protecting the root and original point of measurement and modifying the boot and measurement sequence. Accordingly, a chain of trust can be established using the TPCM chip as the trust anchor, thus allowing the TPCM chip to control the boot, I/O, and provisioning of the system.

During the operation of the computing platform, the TPCM needs to ensure the integrity of the next level executable code before the system transfers control to the next level executable code. The control of the system continues to be transferred to subsequent levels of executable code, thus establishing the chain of trust. More specifically, the TPCM or the TPM can start the boot process from a trusted condition and extend this trust until the operating system has fully booted and applications are running.

Public key cryptography has been used to facilitate the secure electronic transfer of information for a range of network activities such as e-commerce, Internet banking and confidential email. In a public key encryption system, any person can encrypt a message using the public key of the receiver, but such a message can be decrypted only with the receiver's private key. The strength of a public key cryptography system relies on the degree of difficulty (computational impracticality) for a properly generated private key to be determined from its corresponding public key. Public key cryptography systems often rely on cryptographic algorithms based on mathematical problems that currently admit no efficient solution, particularly those inherent in certain integer factorization, discrete logarithm, and elliptic curve relationships. Examples of public key algorithms can include RSA, ECC (elliptic curve cryptography), DSA (digital signature algorithm), the ElGamal signature scheme, etc.

As discussed previously, recent development of advanced quantum computing or cloud computing technologies can have the potential for solving problems that were believed to be computationally infeasible with ordinary computers, thus making conventional data encryption techniques less secure.

Secure System Architecture

Figure 3:
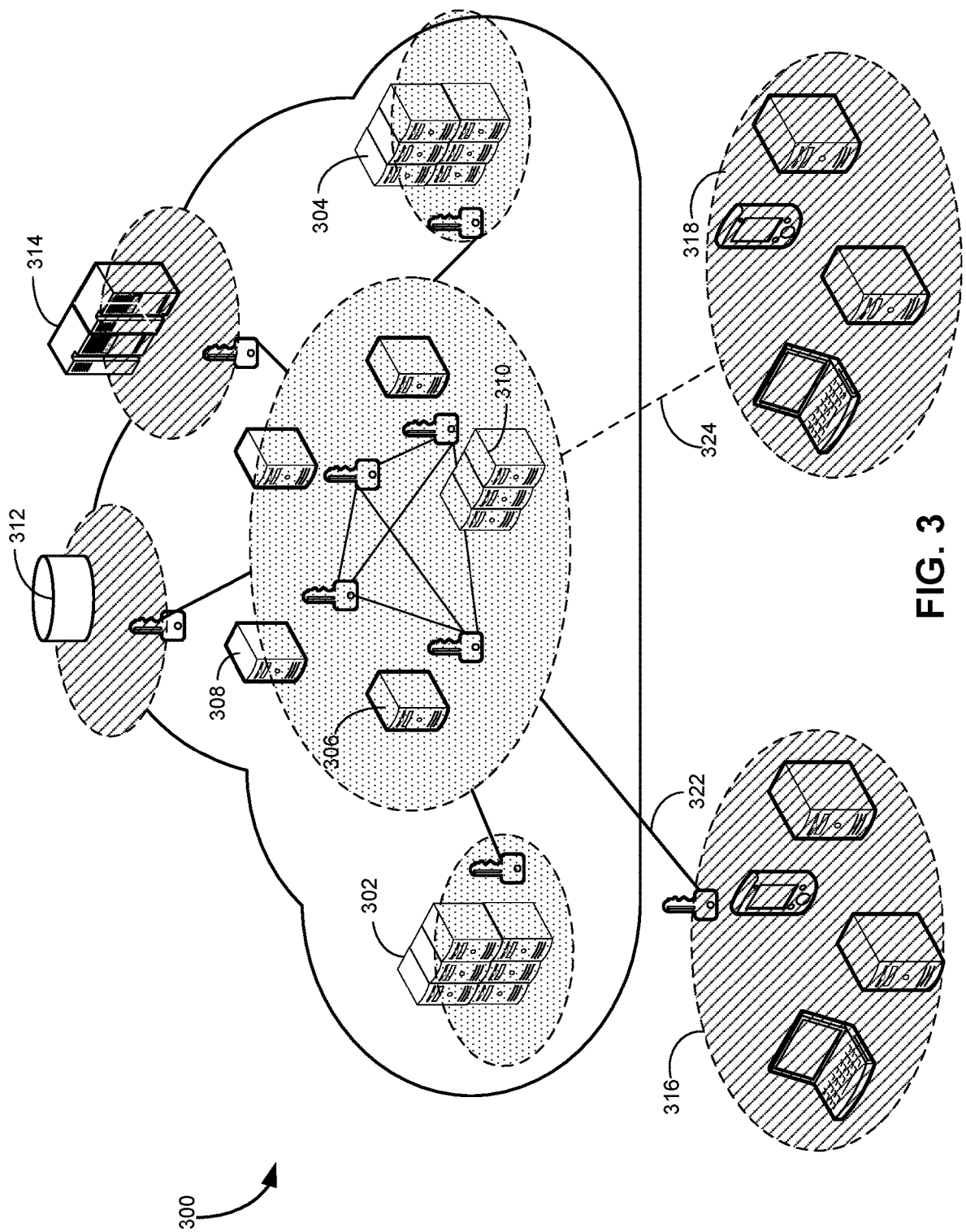
FIG. 3 illustrates the architecture of an exemplary secure cloud computing system based on quantum key distribution and trusted computing, according to one embodiment.

FIG. 3 illustrates the architecture of an exemplary secure cloud computing system based on quantum key distribution and trusted computing, according to one embodiment. A secure cloud computing system 300 can include a number of participating entities, such as the cloud provider and the cloud users. If the trusted certificate is issued by a third party certificate authority (CA), the CA will be also be part of secure cloud computing system 300. CA is not included in the example shown in FIG. 3.

The cloud provider is responsible for providing the cloud control platform and the various cloud infrastructures, including both hardware and software components. In the example shown in FIG. 3, the entire cloud computing system can be divided into two realms, the one controlled by the cloud provider (shown as the shaded area) and the one controlled by the cloud users (shown as the hatched area).

In some embodiments, trusted computing is implemented in both the cloud provider realm and the user realm. For example, equipment provided by the cloud provider, which can include servers (e.g., clusters of servers 302 and 304), cloud control nodes (e.g., nodes 306 and 308), and HSMs (e.g., pool of HSMs 310), can be equipped with modules that enforce trusted computing, such as TPMs. These TPMs can be implemented as hardware, firmware, and software modules. Moreover, user-controlled equipment, such as client machines, databases (e.g., database 312), and cloud-HSMs (e.g., pool of cloud-HSMs 314), can also be equipped with TPMs. The TPMs in the cloud and on the user machines ensure dynamic trust measurement and trusted storage.

In addition to trusted computing, QKD technologies can also be implemented in both the cloud provider realm and the user realm. More specifically, quantum key exchange can be enabled among the cloud nodes, as shown by the key logos. On the other hand, two types of client may exist, one group of clients is equipped with QKD modules (e.g., client group 316), whereas the other group of client (e.g., client group 318) does not have the quantum key exchange capability. In the example shown in FIG. 3, communication channels that also include a quantum channel to enable QKD are shown in solid lines (e.g., communication channel 322), whereas communication channels that do not include a quantum channel are shown in dashed lines (e.g., communication channel 324). More specifically, on the QKD-enabled communication channels, communication partners can negotiate encryption keys using the quantum channel and then use the negotiated keys for secure communication. For example, a user within user group 316 can communicate with the cloud servers using the quantum-enhanced secure channel. Moreover, the user can perform initial configuration of his cloud-HSM via the QKD-enabled communication channels. Similarly, nodes within the cloud (e.g., the cloud control nodes and the cloud servers) can also communicate with each other using keys negotiated via QKD schemes, such as BB84 or Ekert-91 (E91) schemes. On the other hand, users within user group 318 can only communicate with the cloud servers using keys negotiated via conventional technologies.

Figure 4:
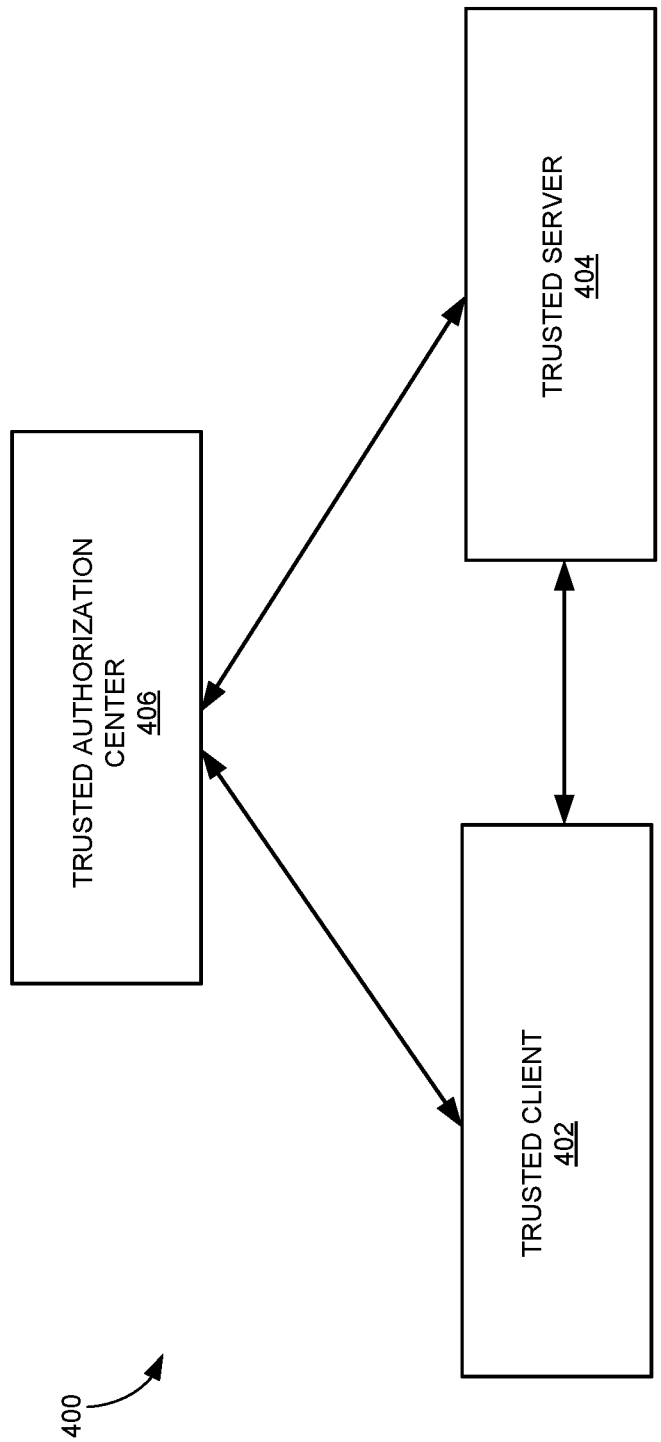
FIG. 4 illustrates a simplified diagram of a secure system, according to one embodiment.

In some embodiments, a plurality of trusted cloud control nodes (e.g., nodes 306 and 308 shown in FIG. 3) can form a trusted authorization center, which can function as a certificate authority (CA) for the cloud. The trusted authorization center can be coupled to the client machine as well as the cloud servers (e.g., server clusters 302 and 304 shown in FIG. 3), and can be responsible for issuing trusted certificates and keys to the servers and clients. FIG. 4 illustrates a simplified diagram of a secure system, according to one embodiment. Secure system 400 can include a trusted client 402, a trusted server 404, and a trusted authorization center 406. Each component in secure system 400 can be trusted computing enable, i.e., it is equipped with a TPM or TPCM.

Trusted server 404 can be a standalone server of a server cluster. Trusted authorization center 406 can include a plurality of trusted control nodes that collectively share and perform the authorization duty. In some embodiments, the trusted control nodes share a cloud private key issued by a third-party CA or generated by a particular trusted control node. In one embodiment, each trusted control node can maintain a share of the cloud private key in its TPM. The TPM ensures secure storage and management of the share of the cloud private key. To ensure secrecy of the system private key, in some embodiments, a (t, n) threshold secret sharing scheme (a Shamir's scheme) can be used to allow n trusted control nodes to share the cloud private key.

In some embodiments, trusted server 404 can generate a private key or a certificate that is bound to the identification of the server and the identification of the cloud control platform, which is provided by trusted authorization center 406. More specifically, quantum-key-encrypted secure communication channels can be established between trusted server 404 and trusted control nodes belonging to trusted authorization center 406. In other words, quantum encryption keys have been distributed via a QKD network. Trusted server 404 can then send a request to a subset of trusted control nodes belonging to trusted authorization center 406. In response, each of the requested trusted control nodes can issue a subkey to trusted server 404. The subkey can be generated by the requested trusted control node based on the requesting server's ID and platform information, which can include the unique identifier of the TPM chip and the platform configuration register (PCR) values. Note that, because the generation of the subkey involves information associated with the server's trusted platform, it is less likely to be cracked compared to the traditional keys used in the PKI system.

The subkey can be sent to trusted server 404 via the corresponding quantum-key-encrypted secure communication channel, thus ensuring security of the distribution. Trusted server 404 receives a set of subkeys and then generates a private key from the set of subkeys. The private of trusted server 404 can be saved in the TPM or TPCM of trusted server 404. Trusted server 404 can also generate a trusted certificate based on this private key. The combination of the trusted computing and QKD technologies used in the generation of the server's private key ensures the secure storage and management of the private key.

Similarly, trusted client 402 and trusted server 404 can negotiate, via QKD, one or more encryption keys (e.g., a symmetric key). During the key negotiation process, trusted client 402 and trusted server 404 may exchange certificates and trusted measurement reports (or TPM reports), which provide status reports of the corresponding platforms. Based on the certificates and trusted measurement reports, the server and client can authenticate and verify the integrities of each other. A QKD process (e.g., BB84) can be performed to allow trusted client 402 and trusted server 404 to obtain a shared key. Trusted client 402 and trusted server 404 can store the negotiated key in their corresponding TPMs. Alternatively, trusted client 402 and trusted server 404 can store the encryption keys in a peripheral storage device. To maintain security, before storing the encryption keys in the peripheral device, the encryption keys can be encrypted using a key for trusted storage. Subsequent to the key exchange, trusted client 402 and trusted server 404 can communicate with each other using the encryption key. In some embodiments, to check for platform integrity during the subsequent communications, trusted client 402 and trusted server 404 can include in each message current PCR values encrypted using the encryption key. Note that, by exchanging the trusted measurement reports during the key negotiation process and by including the PCR values in the exchanged messages, trusted client 402 and trusted server 404 can ensure the integrity of each other; and by using QKD for key distribution, trusted client 402 and trusted server 404 can ensure the security of the key distribution process.

In general, QKD schemes can ensure the distribution security of keys, hence the data transmission security; the trusted-computing-based authentication of the platform and users can ensure the validity of the platform and users; and the trusted-computing-based environment measurement and behavior measurement can ensure the trustworthiness of the environment and behavior of the parties participating the communication.

The secure system can also include other components that implement trusted computing, such as trusted routers, trusted switches, trusted proxy servers in the access layer, etc. They can perform various functionalities in the secure system (e.g., a secure cloud computing system). For simplicity of illustration, these components are not shown in FIGS. 3 and 4.

Operations of the Secure System

In some embodiments, initialization of the secure system can include the initialization of the trusted authorization center, which can include generating a CA certificate and a public-private key pair. In some embodiments, the trusted authorization center can include a single entity, and the CA certificate and the private key can be obtained from a third-party trusted authority. Before issuing a certificate, the third-party trust authority verifies the identity and platform information associated with the trusted authorization center. Alternatively, the trusted authorization center can include multiple trusted control nodes, which collectively manage and control the trusted authorization center.

Figure 5:
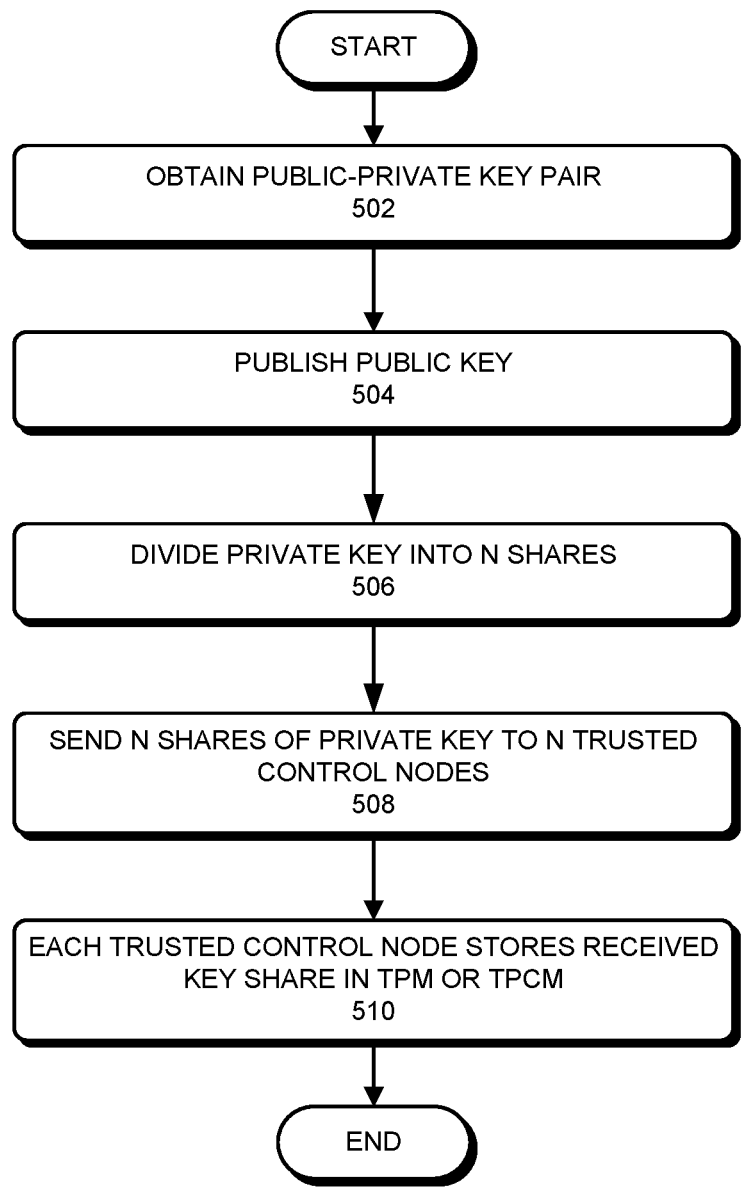
FIG. 5 presents a flowchart illustrating an exemplary initialization process of a trusted authorization center, according to one embodiment.

FIG. 5 presents a flowchart illustrating an exemplary initialization process of a trusted authorization center, according to one embodiment. During initialization, a public-private key pair associated with the trusted authorization center is obtained (operation 502). This public-private key pair can be obtained from a third-party trusted authority or can be generated by a master trusted control node within the trusted authorization center. Note that various criteria can be used to select the master trusted control node, such as a level of trustworthiness. Alternatively, the master trusted control node can be selected randomly. In some embodiments, the public-private key pair can be generated by the TPM or TPCM chip of the master trusted control node.

The public key of the public-private key pair is published (operation 504). More specifically, this public key can be published to all control nodes within the trusted authorization center. Additionally, other nodes in the cloud can also be notified of this public key. The private key (also known as the cloud private key) can then be divided into a number of shares using a secret-sharing scheme (e.g., the (t, n) threshold scheme) (operation 506). Note that the (t, n) threshold secret sharing scheme allows a secret to be divided into n shares and any t (or a number that is greater than t) out of n shares can be used to recover the secret. If there are n trusted control nodes within the trusted authorization center, the private key can be divided into n shares, each shared being noted as $S_i$ (i=1, 2, . . . , n). Then shares of the cloud private key can then be sent, via quantum-enhanced secure communication channels, to the n trusted control nodes, one share per node (operation 508). Note that the quantum-enhanced secure channels can be established among trusted control nodes via a QKD process. For example, any two trusted control nodes can exchange, via QKD, a symmetric key that can be used for encryption. A particular share of the cloud private key can be encrypted using the symmetric key before being sent to a receiving trusted control node.

Each trusted control node can then store the received share of the cloud private key ($S_i$) in its TPM or TPCM chip (operation 510). To distinguish from the public-private key pair generated by each individual trusted control node, the public-private key pair for the trusted authorization center can be referred to as the cloud public-private key pair. To prevent loss of the cloud private key due to the master trusted control node being attacked or compromised, the master trusted control node may delete the cloud private key as well as the shares sent to other trusted control nodes.

When a server first joins the cloud, it also needs to be initialized in order to obtain a trusted certification and private key from the trusted authorization center of the cloud. More specifically, after mutual authentication between the newly joined cloud server and the trusted authorization center, the trusted authorization center can issue a server-specific private key to the cloud server. The server-specific private key can be generated based on both the identification of the cloud server and the cloud private key. The cloud server can generate a trusted certificate based on the server-specific private key.

Figure 6:
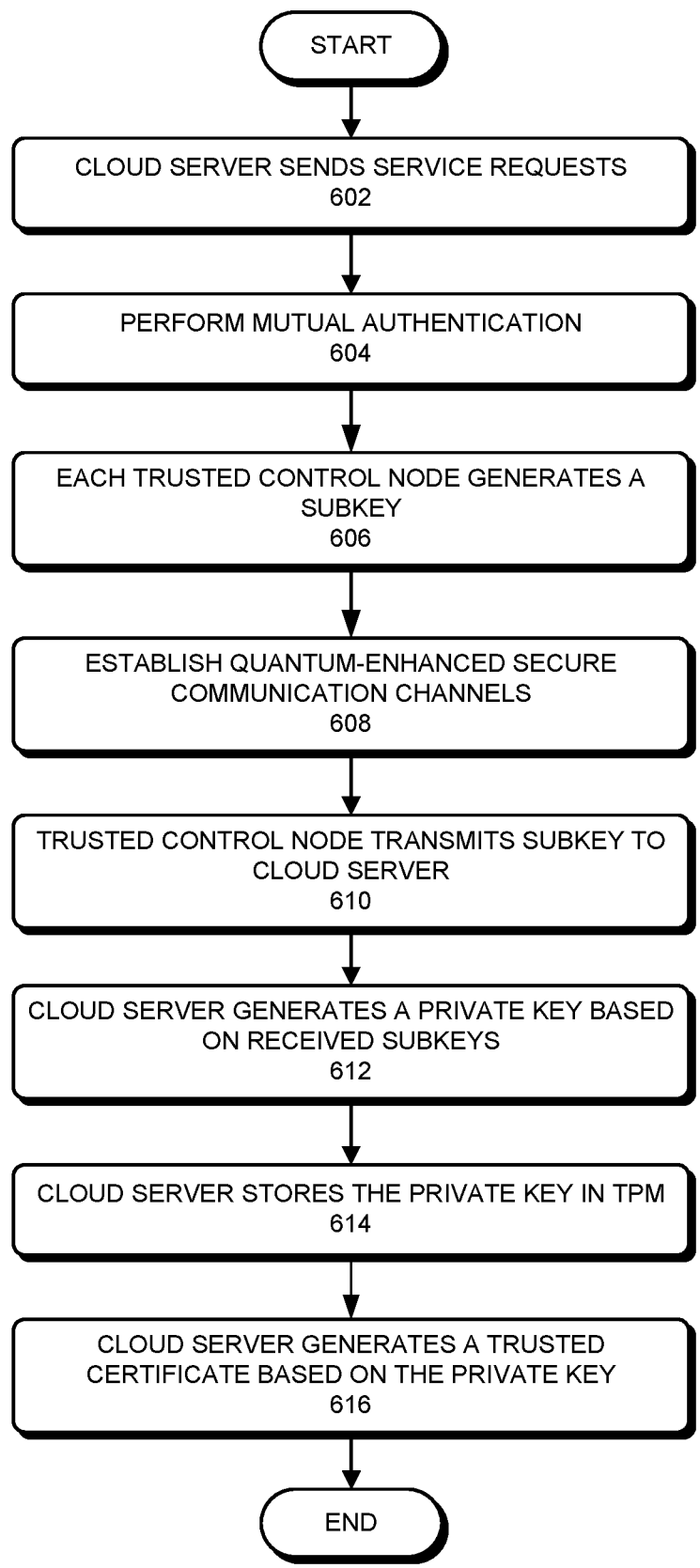
FIG. 6 presents a flowchart illustrating an exemplary initialization process of a trusted cloud server, according to one embodiment.

FIG. 6 presents a flowchart illustrating an exemplary initialization process of a trusted cloud server, according to one embodiment. During initialization, the trusted cloud server sends service requests to a subset of trusted control nodes belonging to the trusted authorization center (operation 602) and performs mutual authentication with each trusted control node receiving a request (operation 604). The number of trusted control nodes in the subset depends on the secret sharing scheme used for sharing the cloud private key. For example, if the (t, n) threshold scheme was used, the server may send the service request to at least t trusted control nodes. The mutual authentication can be performed by exchanging digital certificates. More specifically, the trusted cloud server can attach to its service request a digital certificate that is bound to its identity and its TPM. In response, the receiving trusted control node can also send to the trusted cloud server its own digital certificate, which is also bound to the identity and TPM of the trusted control node.

Subsequent to the mutual authentication, each trusted control node may generate a subkey for the requesting cloud server (operation 606). More specifically, the subkey can be generated based on the identity and TPM information of the requesting cloud server. The TPM information can include the unique identifier of the TPM and the PCR values. Note that the PCR values can be used to extract the initial trusted measurement result of the trusted platform, and can later be used as a baseline for subsequent measurement of the trustworthiness of the platform. In some embodiments, other trusted control nodes can send the extracted initial trusted measurements results of the requesting cloud server to the master trusted control node, which can be responsible for maintaining a record of the initial trusted measurement results associated with the requesting cloud server.

A subkey generated by trusted control node r for cloud server u can be calculated as: $S_{ur}=S_{i_r}(u_{ID}/TPM_{ID}/\text{expire\_time})$, where i=1, . . . , n; r=1, . . . , t; and $i_r$ indicates any t nodes selected from the n nodes. For example, i=3 and t=1 can refer to a trusted control node selected from three control nodes, and $S_{i_r}$ can be the cloud subkey (or the share of the cloud private key) stored in the TPM of the requested trusted control node. Expire_time can be the value of a timestamp, $u_{ID}$ can be calculated based on the identity of the requesting cloud server according to a certain algorithm, and $TPM_{ID}$ can be calculated based on the TPM information of the requesting cloud server according to a certain algorithm. If a TPCM is used instead of a TPM, $TPCM_{ID}$ can be used in the formula. $u_{ID}/TPM_{ID}/\text{expire\_time}$ can indicate a predetermined algorithm that can generate an output based on these three parameters. In addition to subkey $S_{ur}$, the requested trusted control node can also generate a sub-certificate for the requesting cloud server based on the subkey.

The requesting cloud server and the requested trusted control node can establish a quantum-enhanced secure communication channel (operation 608), and the requested trusted control node can transmit the subkey to the requesting could server (operation 610). Establishing the quantum-enhanced secure communication channel between the cloud server and the trusted control node can involve a QKD process (e.g., BB84), in which a symmetric key can be negotiated, and transmitting the subkey to the cloud server can involve encrypting the subkey using the negotiated symmetric key. Upon receiving the encrypted subkey, the requesting cloud server can decrypt it using the negotiated symmetric key.

Subsequent to receiving subkeys from the subset of trusted control nodes (e.g., t trusted control nodes), the requesting cloud server can combine the subkeys to generate its own private key (operation 612). More specifically, by receiving t subkeys from the t trusted control node, the entity essentially obtains the coordinate of the t points, $(X_{i1},S_{u1})$, $(X_{i2},S_{u2})$, . . . , $(X_{it},S_{ut})$, and can then using Lagrange interpolation to obtain original function f(X). An server-specific private key for cloud server u (i.e., $S_u$) can be calculate as f(0). In some embodiment, $S_u$ can be calculated as:

$$S_u = \sum_{r=1}^{t}\left(\prod_{j\ne r, j=1}^{t}\frac{X-X_{i_j}}{X_{i_r}-X_{i_j}}\right)S_{i_r}(u_{ID}/TPM_{ID}/\text{expire\_time}),$$

$$= \sum_{r=1}^{t}\left(\prod_{j\ne r, j=1}^{t}\frac{X-X_{i_j}}{X_{i_r}-X_{i_j}}\right)S_{ur}$$

where X is the variables used in Lagrange interpolation, and can be set as being equal to 1, 2, 3, . . . .

The cloud server can then store the generated private key in its TPM (operation 614). The cloud server can create a trusted certificate based on such a private key (operation 616). The trusted certificate can later be used for authenticating the cloud server as being part of the trusted cloud platform provided by the trusted authorization center.

A cloud client can also obtain a trusted certificate and private key using a process similar to the one shown in FIG. 6. Once a trusted cloud server and a trusted cloud client join the cloud, a secure communication channel can be established between the cloud server and the cloud client. More specifically, the secure communication can be established based on both the QKD technology and the trusted computing technology.

Figure 7:
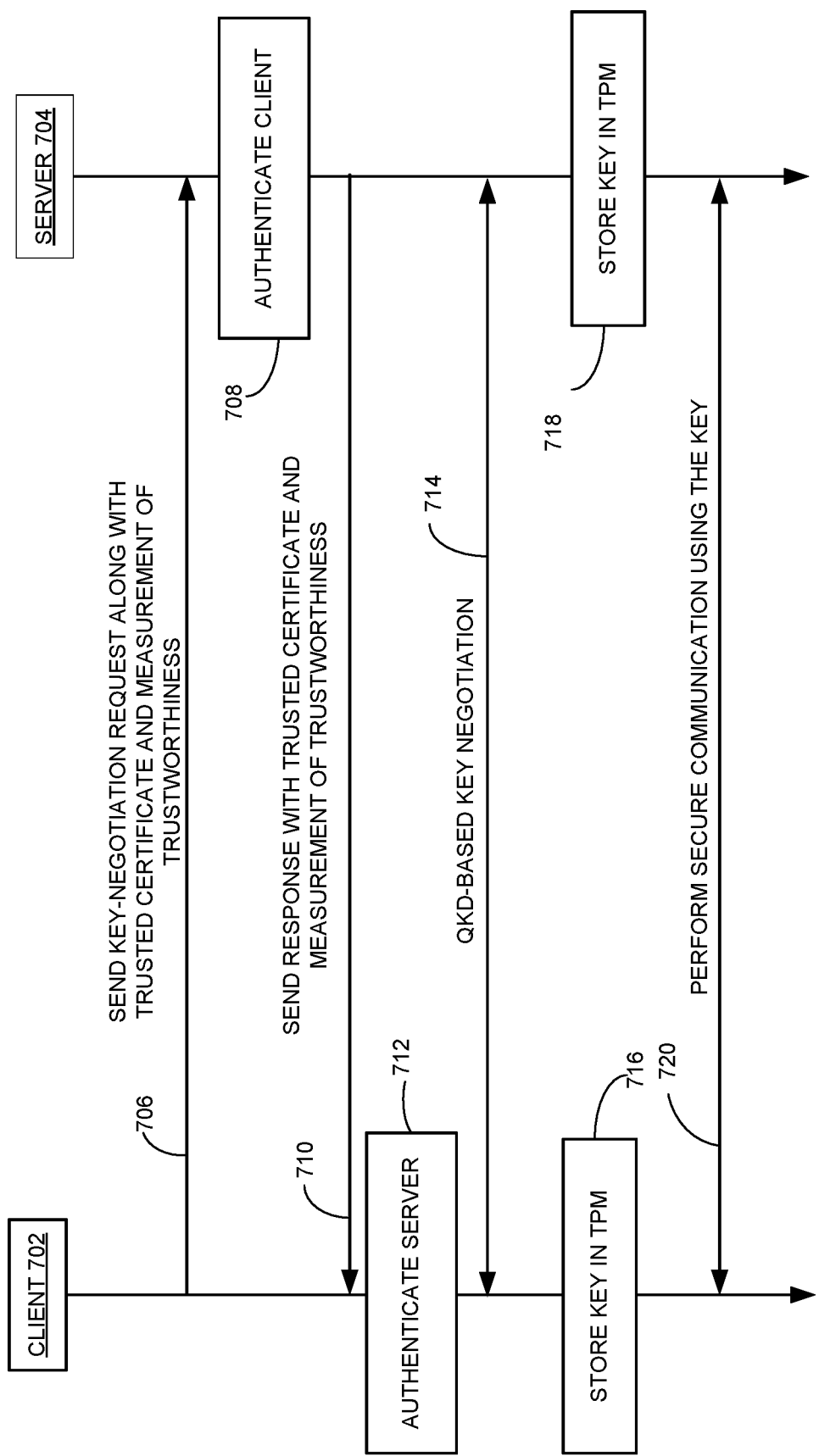
FIG. 7 presents a diagram describing the process of establishing a secure communication channel between a trusted client and trusted cloud server, according to one embodiment.

FIG. 7 presents a diagram describing the process of establishing a secure communication channel between a trusted client and trusted cloud server, according to one embodiment. During operation, a trusted client 702 sends a key-negotiation request to a trusted server 704 (operation 706). The request can include a trusted certificate (which can be stored in the TPM of trusted client 702) and a trusted measurement report, which reflects the trustworthiness of trusted client 702. Trusted server 704 authenticates trusted client 702 based on both the trusted certificate and the trusted measurement report (operation 708).

Trusted server 704 can then send a response to trusted client 702 (operation 710). The response can include the trusted certificate issued by the trusted authorization center and a trusted measurement report, which reflects the trustworthiness of trusted server 704. Upon receiving the response, trusted client 702 authenticates trusted server 704 based on the both the trusted certificate and the measurement report of trustworthiness (operation 712).

Subsequent to the mutual authentication, trusted client 702 and trusted server 704 can negotiate, using a QKD scheme (e.g., BB84), a symmetric key (operation 714), and store such a key in their corresponding TPMs or TPCMs (operations 716 and 718). Trusted client 702 and trusted server 704 can then communicate with each other securely using the negotiated key (operation 720). To ensure both parties' integrity, each exchanged message can include the PCR values, which are also encrypted using the negotiated key. For example, the encrypted current PCR values obtained from the client's TPM can be attached to a message sent by the client to a server. Similarly, the encrypted current PCR values obtained from the server's TPM can be attached to a message sent by the server to the client. Note that, in addition to using QKD to ensure security of the key distribution process, by storing the encryption key in TPMs and by verifying PCR values in each exchange, embodiments disclosed herein can also ensure integrity of the platforms during the communication process.

Figure 8A:
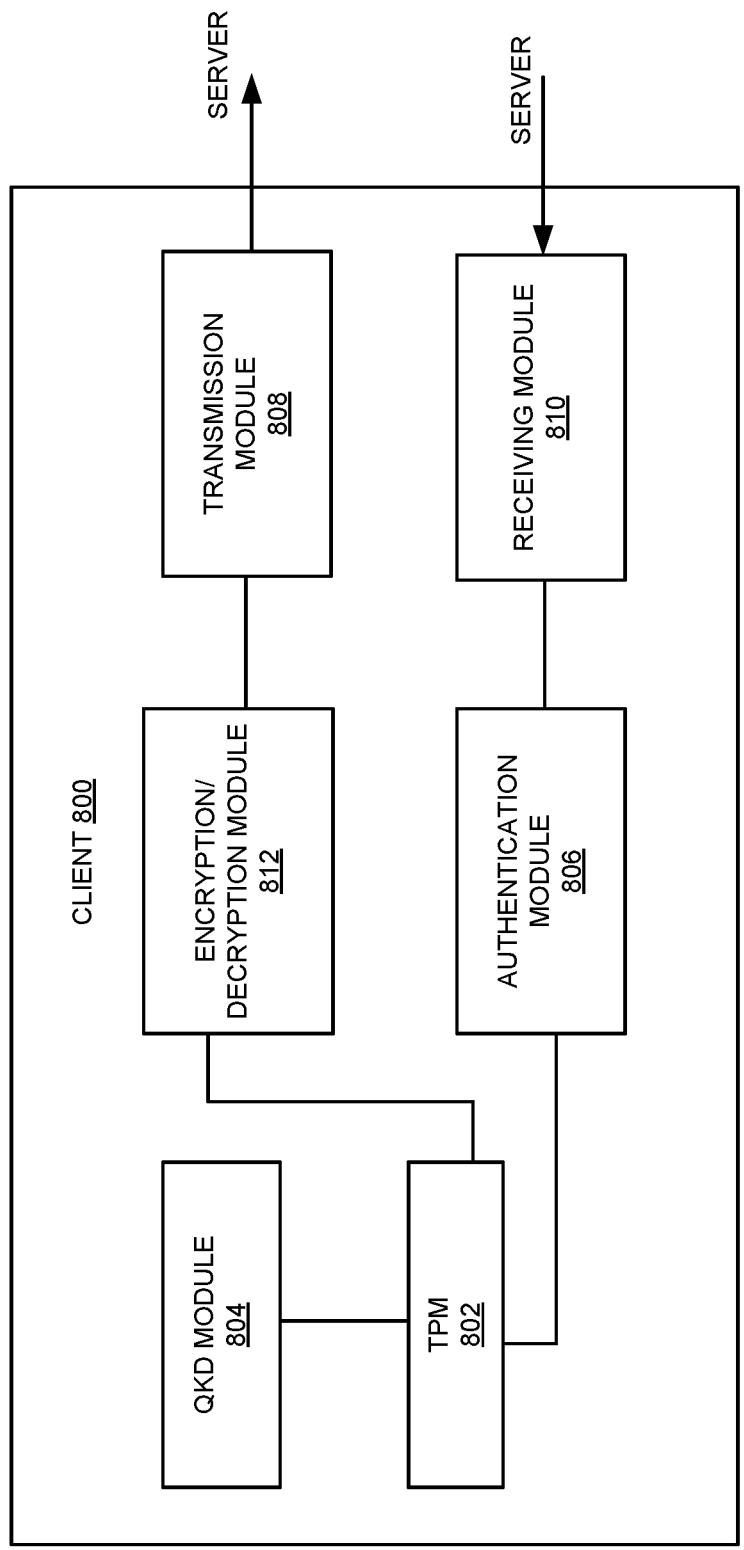
FIG. 8A illustrates a block diagram of a trusted client, according to one embodiment.

FIG. 8A illustrates a block diagram of a trusted client, according to one embodiment. Trusted client 800 can include a TPM 802, a QKD module 804, an authentication module 806, a transmission module 808, a receiving module 810, and an encryption/decryption module 812. TPM 802 can provide various trusted computing functionalities, including storing and generating keys and/or certificates, and monitoring the platform status. QKD module 804 can be responsible for key negotiation over a quantum channel. The negotiated key is stored in TPM 802. Authentication module 806 can be responsible for authenticating a communication partner, such as a trusted cloud server. In some embodiments, in addition to identity verification, authentication module 806 can also verify the integrity of the communication partner based on the TPM report (which can include various metrics of the trustworthiness) sent by the communication partner. In some embodiments, authentication module 806 can be included in TPM 802. Transmission module 808 can be responsible for transmitting messages to a communication partner. The messages can include key-negotiation requests, messages exchanged during key-negotiation, and secure communication messages. Receiving module 810 can be responsible for receiving messages from a communication partner. The messages can include key-negotiation responses, messages exchanged during key-negotiation, and secure communication messages. To facilitate QKD, transmission module 808 or receiving module 810 can also be coupled to a quantum channel. Encryption/decryption module 812 can be responsible for encrypting to-be-sent messages and decrypting received messages during secure communication sessions.

Figure 8B:
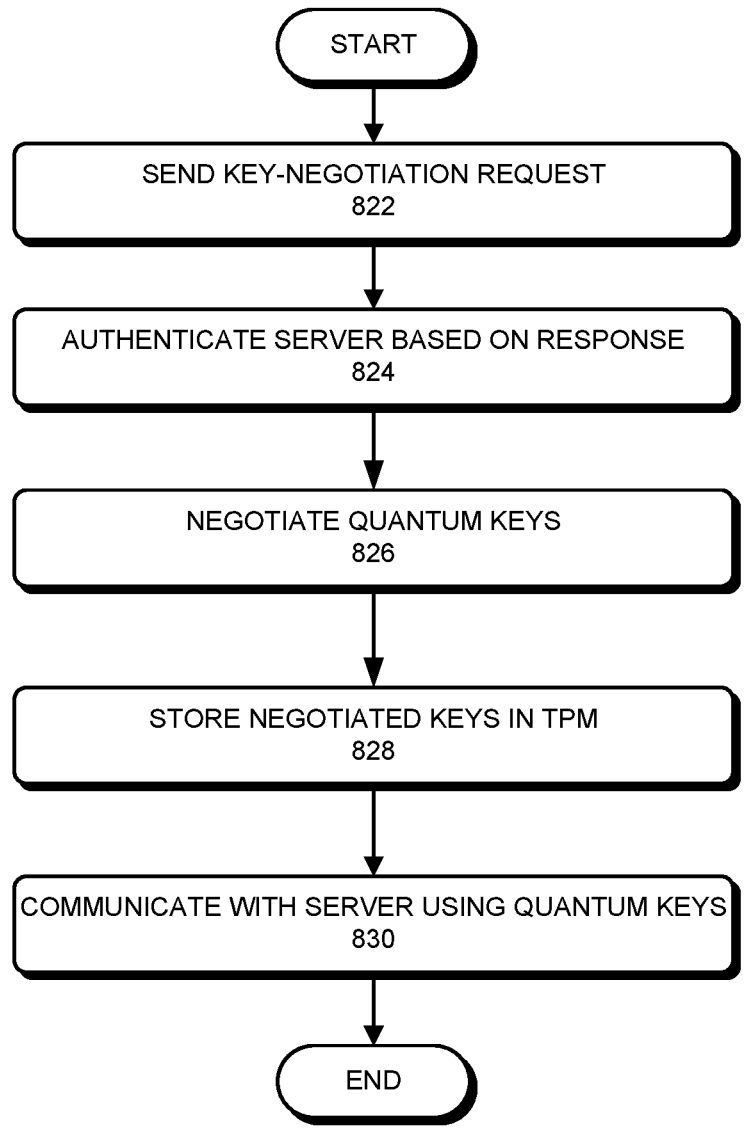
FIG. 8B presents a flowchart illustrating a client process for establishing a secure communication channel, according to one embodiment.

FIG. 8B presents a flowchart illustrating a client process for establishing a secure communication channel, according to one embodiment. During operation, a trusted client can send a key-negotiation request to a cloud server (operation 822). The key-negotiation request can include a trusted certificate issued to the client by the trusted authorization center of the cloud and a trusted measurement report provided by the TPM of the client. Upon receiving a response from the cloud server, the client authenticates the cloud server based on both the server's trusted certificate and trusted measurement report (operation 824). The cloud can then negotiate, using a QKD process, one or more quantum keys with the server (operation 826), and store the negotiated keys in its TPM (operation 828). In some embodiments, the negotiated keys can be protected by the storage root key provided by the TPM. Subsequent to the key negotiation, the client can communicate with the cloud server using the negotiated keys (operation 830). In some embodiments, during communication, the client can include its trusted platform information (e.g., PCR values) in each message sent to the cloud server to allow the cloud server to determine the platform integrity of the client.

Figure 9A:
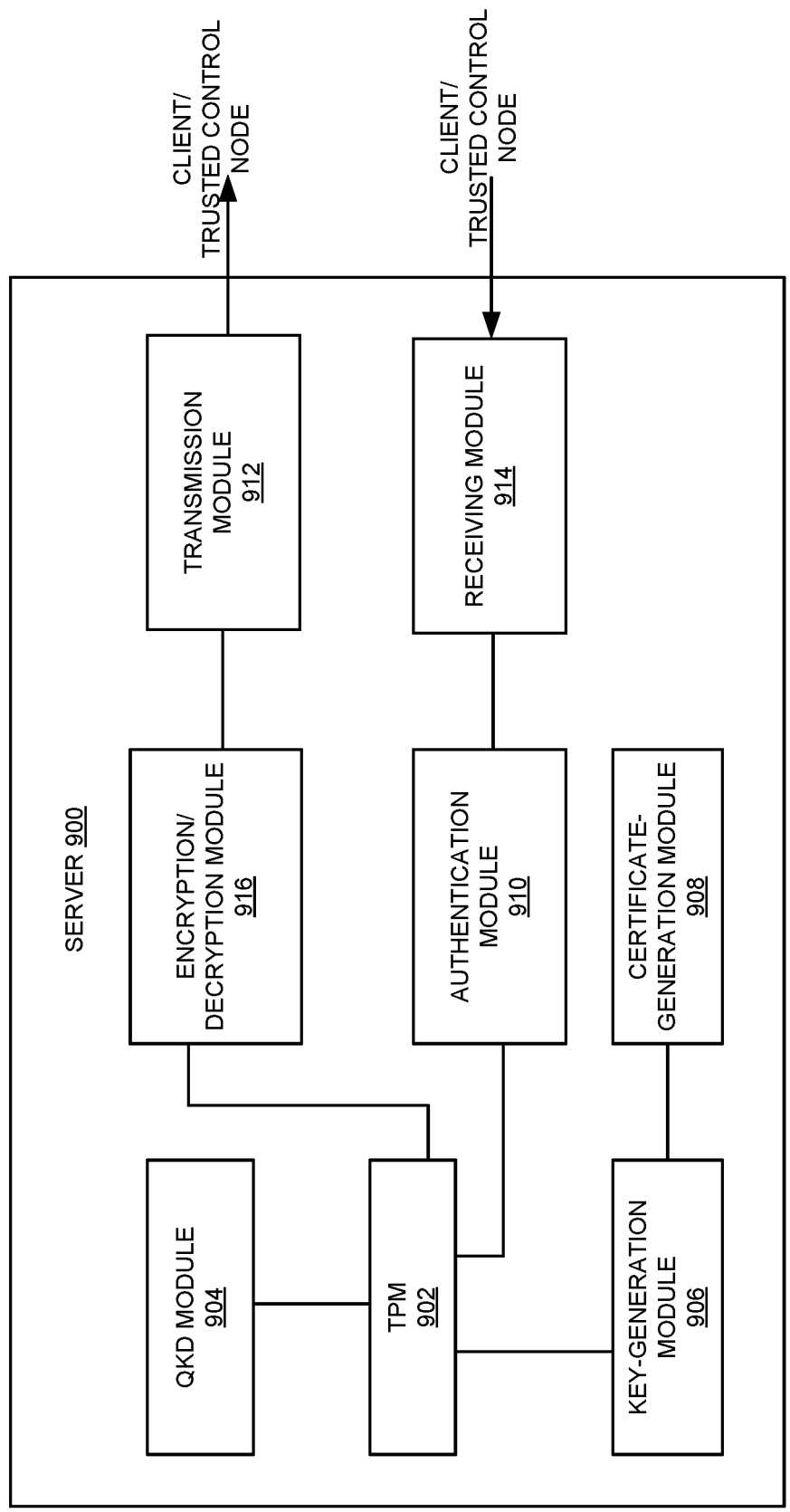
FIG. 9A illustrates a block diagram of a trusted server, according to one embodiment.

FIG. 9A illustrates a block diagram of a trusted server, according to one embodiment. Trusted server 900 can include a TPM 902, a QKD module 904, a key-generation module 906, a certificate-generation module 908, an authentication module 910, a transmission module 912, a receiving module 914, and an encryption/decryption module 916.

TPM module 902 can be similar to TPM module 802 shown in FIG. 8. QKD module 904 is not only responsible for key negotiation between server 900 and a client, but also responsible for key negotiation between server 900 and the trusted authorization center. Key-generation module 906 can be responsible for generating a server-specific private key based on a set of subkeys received from the trusted authorization center. Certificate-generation module 908 can generate a signing certificate based on the server-specific private key. In some embodiments, key-generation module 906 and certificate-generation module 908 can be part of TPM 902. Authentication module 910 can be responsible for authenticating a communication partner, which can be a trusted control node or a client. Transmission module 912 and receiving module 914 can be responsible for transmitting messages to and receiving messages from a communication partner, respectively. The communication partner can be a trusted control node or a client. To facilitate QKD, transmission module 912 or receiving module 914 can also be coupled to a quantum channel. Encryption/decryption module 916 can be similar to encryption/decryption module 812 shown in FIG. 8.

Figure 9B:
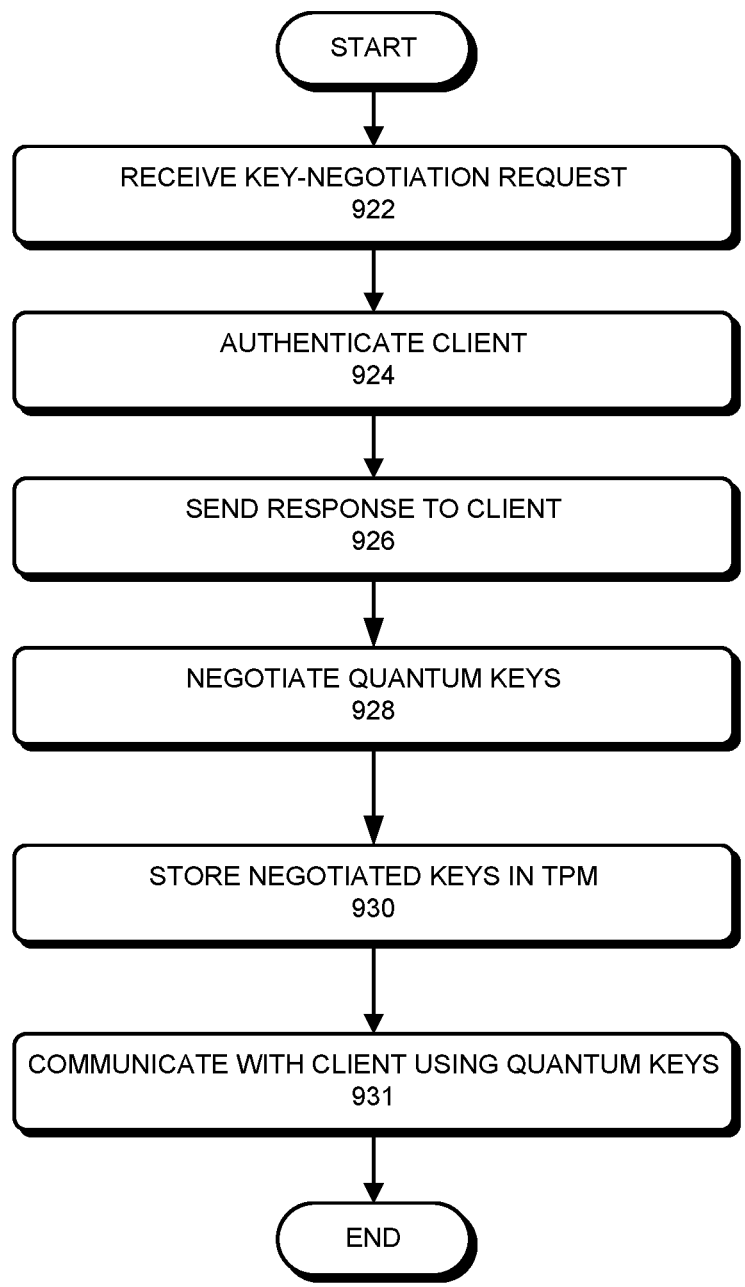
FIG. 9B presents a flowchart illustrating a server process for establishing a secure communication channel, according to one embodiment.

FIG. 9B presents a flowchart illustrating a server process for establishing a secure communication channel, according to one embodiment. During operation, the trusted server receives a key-negotiation request from a client (operation 922). The key-negotiation request can include a trusted certificate issued to the client by the trusted authorization center of the cloud and a trusted measurement report provided by the TPM of the client. The server authenticates the client (operation 924) and sends a response that includes the server's trusted certificate and trusted measurement report to allow the client to authenticate the server (operation 926). Subsequent to the mutual authentication, the server can then negotiate, using a QKD process, one or more quantum keys with the client (operation 928), and store the negotiated keys in its TPM (operation 930). Subsequent to the key negotiation, the server can communicate with the client using the negotiated keys (operation 932). In some embodiments, during communication, the server can include its trusted platform information (e.g., PCR values) in each message sent to the client to allow the client to determine the platform integrity of the server.

Figure 10:
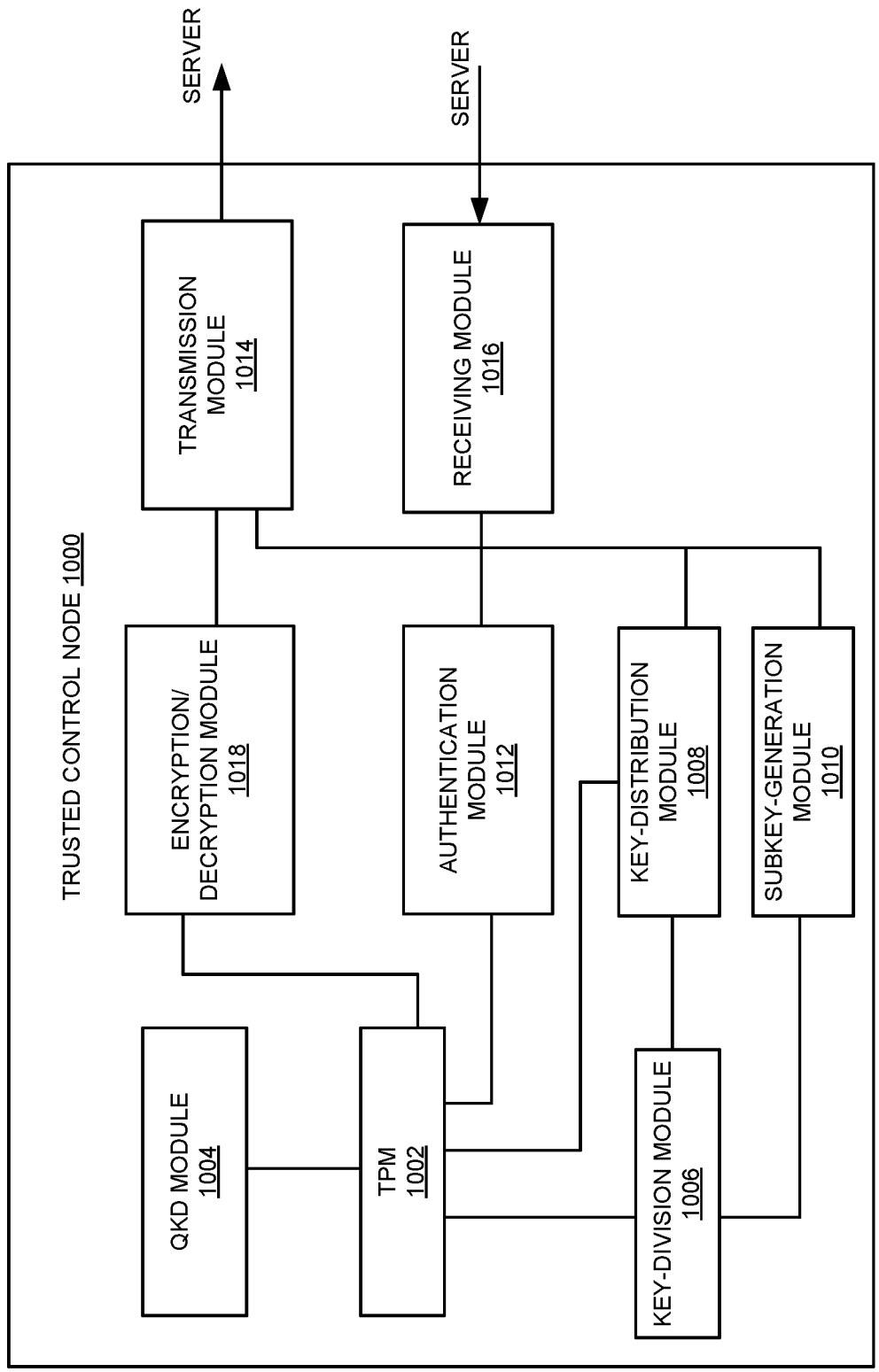
FIG. 10 illustrates a block diagram of a trusted control node, according to one embodiment.

FIG. 10 illustrates a block diagram of a trusted control node, according to one embodiment. Without the loss of generality, trusted control node 1000 can be the node selected for generating the cloud private key. Trusted control node 1000 can include a TPM 1002, a QKD module 1004, a key-division module 1006, a key-distribution module 1008, a subkey-generation module 1010, an authentication module 1012, a transmission module 1014, a receiving module 1016, and an encryption/decryption module 1018.

TPM 1002 can be similar to TPM modules 802 and 902 shown in FIG. 8 and FIG. 9, respectively. Moreover, TPM 1002 can be responsible for generating a cloud private key. QKD module 1004 can be responsible for key negotiation between trusted control node 1000 and a server 900. In addition, QKD module 1004 can be responsible for key negotiation between trusted control node 1000 and other trusted control nodes. Key-division module 1006 can be responsible for dividing the cloud private key into a number of parts, and key-distribution module 1008 can be responsible for distributing the different parts of the cloud private key to different trusted control nodes. A part of the divided cloud private key can also be stored in TPM 1002.

Subkey-generation module 1010 can be responsible for generating a subkey in response to receiving an initialization request from a trusted cloud server. More specifically, the subkey can be generated based on the share of the cloud private key stored in TPM 1002, a timestamp value, and the identity and platform information (e.g., the unique identifier and PCR values of the TPM) associated with the requesting trusted cloud server. In some embodiments, subkey-generation module 1010 can be part of TPM 1002. Authentication module 1012 can be responsible for authenticating a communication partner, which can be a trusted server or a peer trusted control node. Transmission module 1014 and receiving module 1016 can be responsible for transmitting messages to and receiving messages from a communication partner, respectively. The communication partner can be a trusted server or a peer trusted control node. To facilitate QKD, transmission module 1014 or receiving module 1016 can also be coupled to a quantum channel. Encryption/decryption module 1018 can be similar to encryption/decryption module 812 shown in FIG. 8.

In general, embodiments disclosed herein provide a solution to the technical problem of ensuring data and computational security in the setting of cloud computing. More specifically, various entities within the cloud, including controller nodes, server nodes, client nodes, etc., can be equipped with hardware, firmware, or software modules that can enforce rules for trusted computing and devices that can enable quantum key exchange. The combination of trusted computing and QKD strengthens the security. More specifically, QKD can provide security assurance regarding key distribution and data transmission, whereas trusted computing technology can provide security assurance regarding the authenticity of the identities of the parties participating the communication. Moreover, trusted computing can provide dynamic runtime monitoring of computing environment and behaviors, thus providing security assurance regarding the integrity of the cloud platform. The operating processes and system diagrams shown in FIGS. 5-10 are for exemplary purposes only. The various nodes in the cloud computing system may perform different operations and have different structures, as long as they are able to accomplish exchange of certain keys via a QKD scheme and enforce some or all of the trusted computing rules.

Figure 11:
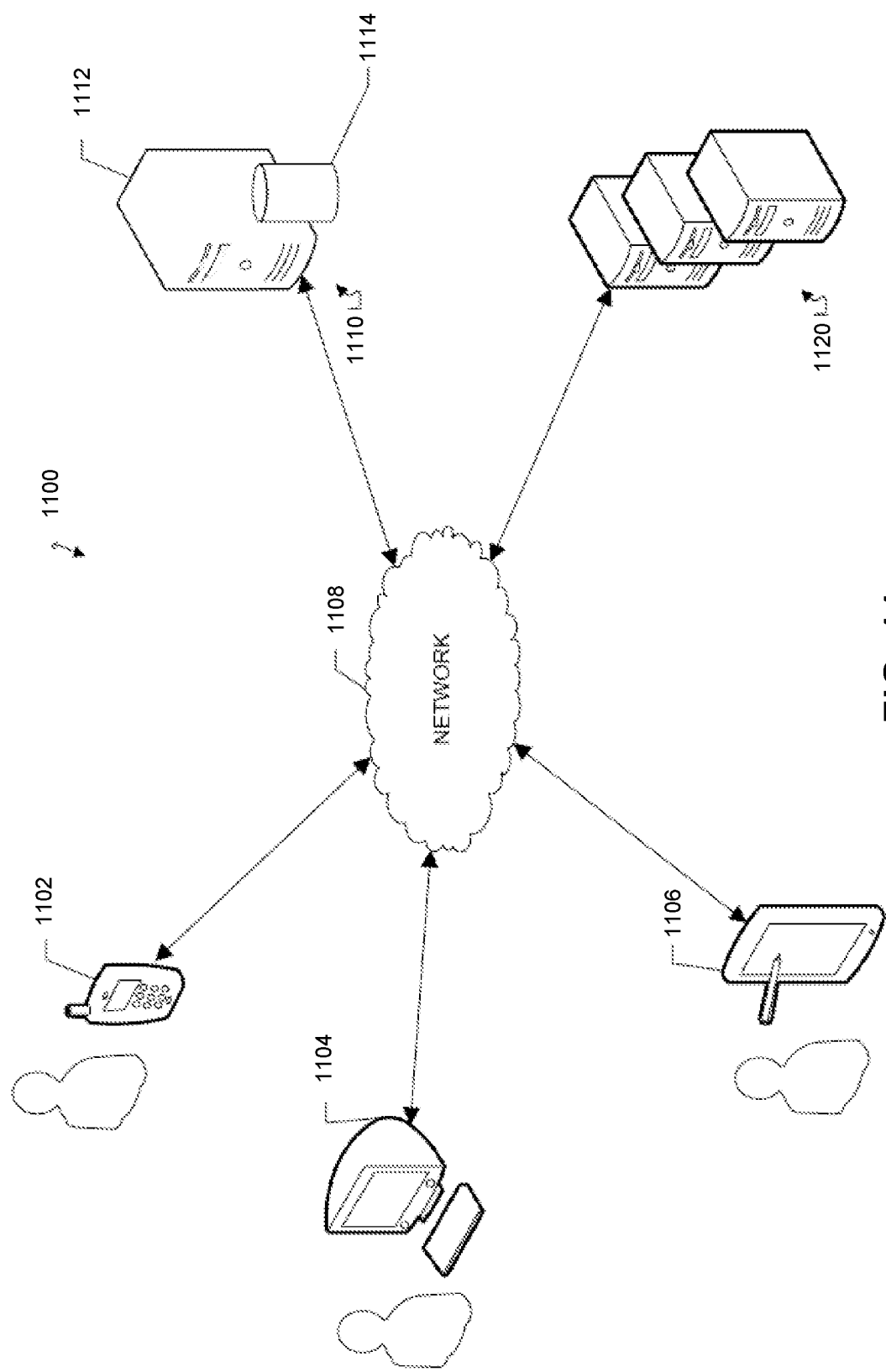
FIG. 11 illustrates an exemplary client-server network environment for implementing the disclosed eavesdropping-detection technology, in accordance with some embodiments described herein.

FIG. 11 illustrates an exemplary client-server network environment for implementing the disclosed eavesdropping-detection technology, in accordance with some embodiments described herein. A network environment 1100 includes a number of electronic devices 1102, 1104 and 1106 communicably connected to a server 1110 by a network 1108. One or more remote servers 1120 are further coupled to the server 1110 and/or the one or more electronic devices 1102, 1104 and 1106.

In some exemplary embodiments, electronic devices 1102, 1104 and 1106 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 1102, 1104 and 1106 store a user agent such as a browser or application. In the example of FIG. 11, electronic device 1102 is depicted as a smartphone, electronic device 1104 is depicted as a desktop computer, and electronic device 1106 is depicted as a PDA.

Server 1110 includes a processing device 1112 and a data store 1114. Processing device 1112 executes computer instructions stored in data store 1114, for example, to assist in scheduling a customer-initiated service or a service-provider-initiated service between a service provider and a customer at electronic devices 1102, 1104 and 1106 during a service scheduling process.

In some exemplary aspects, server 1110 can be a single computing device such as a computer server. In other embodiments, server 1110 can represent more than one computing device working together to perform the actions of a server computer (e.g., cloud computing). The server 1110 may host the web server communicably coupled to the browser at the client device (e.g., electronic devices 1102, 1104 or 1106) via network 1108. In one example, the server 1110 may host a client application for scheduling a customer-initiated service or a service-provider-initiated service between a service provider and a customer during a service scheduling process. Server 1110 may further be in communication with one or more remote servers 1120 either through the network 1108 or through another network or communication means.

The one or more remote servers 1120 may perform various functionalities and/or storage capabilities described herein with regard to the server 1110 either alone or in combination with server 1110. Each of the one or more remote servers 1120 may host various services. For example, servers 1120 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 1110 may further maintain or be in communication with social networking services hosted on one or more remote servers 1120. The one or more social networking services may provide various services and may enable users to create a profile and associate themselves with other users at a remote social networking service. The server 1110 and/or the one or more remote servers 1120 may further facilitate the generation and maintenance of a social graph including the user-created associations. The social graphs may include, for example, a list of all users of the remote social networking service and their associations with other users of a remote social networking service.

Each of the one or more remote servers 1120 can be a single computing device such as a computer server or can represent more than one computing device working together to perform the actions of a server computer (e.g., cloud computing). In one embodiment server 1110 and one or more remote servers 1120 may be implemented as a single server or a cluster of servers. In one example, server 1110 and one or more remote servers 1120 may communicate through the user agent at the client device (e.g., electronic devices 1102, 1104 or 1106) via network 1108.

Users may interact with the system hosted by server 1110, and/or one or more services hosted by remote servers 1120, through a client application installed at the electronic devices 1102, 1104, and 1106. Alternatively, the user may interact with the system and the one or more social networking services through a web-based browser application at the electronic devices 1102, 1104, 1106. Communication among client devices 1102, 1104, 1106 and the system, and/or one or more services, may be facilitated through a network (e.g., network 1108).

Communications among the client devices 1102, 1104, 1106, server 1110 and/or one or more remote servers 1120 may be facilitated through various communication protocols. In some aspects, client devices 1102, 1104, 1106, server 1110 and/or one or more remote servers 1120 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 1108 can include, for example, any one or more of a personal area network (PAN), a local area network (LAN), a campus area network (CAN), a metropolitan area network (MAN), a wide area network (WAN), a broadband network (BBN), the Internet, and the like. Further, network 1108 can include, but is not limited to, any one or more of the following network topologies, including a bus network, a star network, a ring network, a mesh network, a star-bus network, a tree or hierarchical network, and the like.

Figure 12:
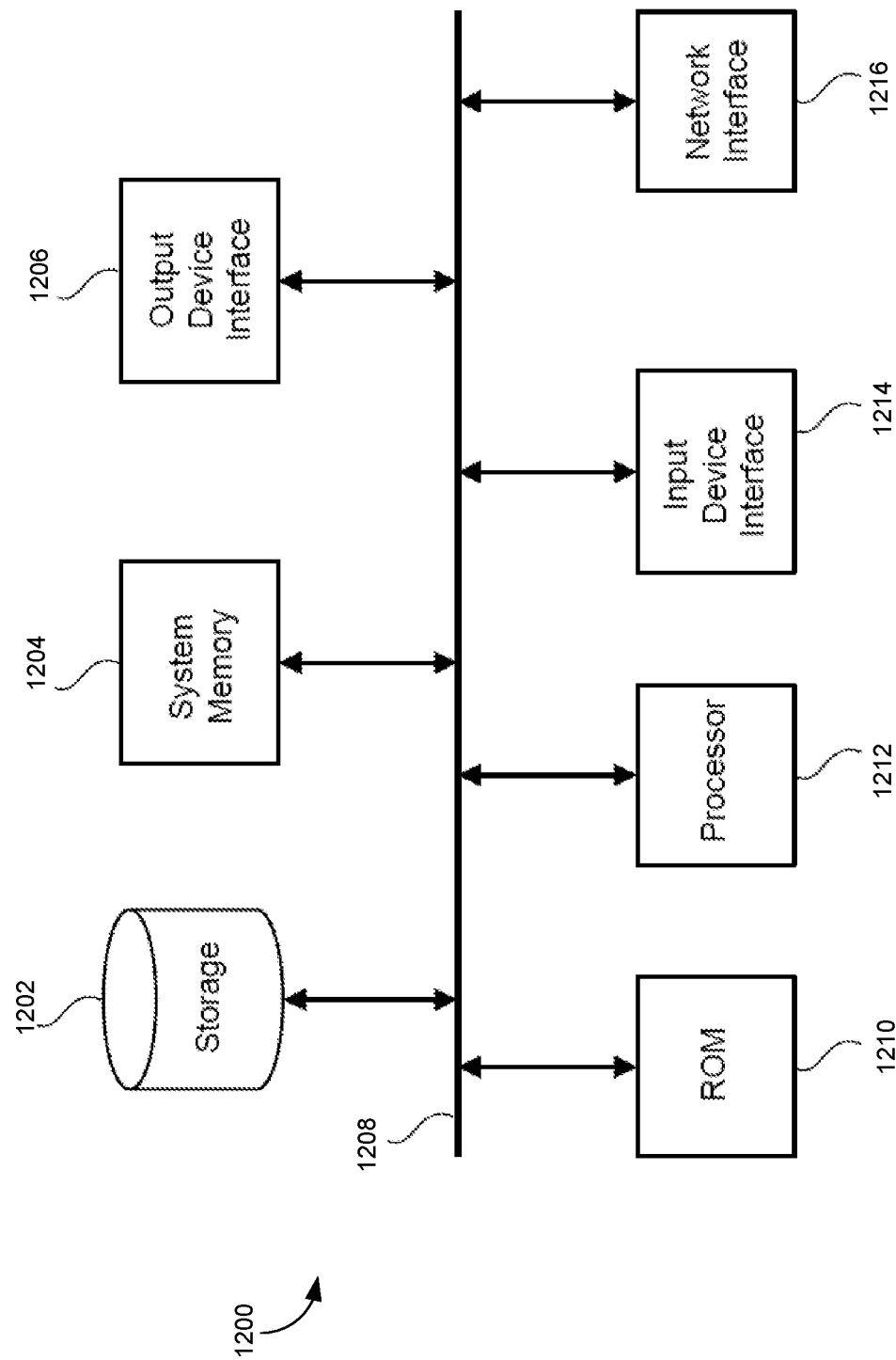
FIG. 12 conceptually illustrates an electronic system with which some implementations of the subject technology are implemented.

FIG. 12 conceptually illustrates an electronic system with which some implementations of the subject technology are implemented. Electronic system 1200 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1200 includes a bus 1208, processing unit(s) 1212, a system memory 1204, a read-only memory (ROM) 1210, a permanent storage device 1202, an input device interface 1214, an output device interface 1206, and a network interface 1216.

Bus 1208 collectively represents all system, peripheral, and chipset buses that communicatively connect the numerous internal devices of electronic system 1200. For instance, bus 1208 communicatively connects processing unit(s) 1212 with ROM 1210, system memory 1204, and permanent storage device 1202.

From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of electronic system 1200. Permanent storage device 1202, on the other hand, is a read-and-write memory device. This device is a non-volatile memory unit that stores instructions and data even when electronic system 1200 is off. Some implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such a random access memory. System memory 1204 stores some of the instructions and data that the processor needs at runtime. In some implementations, the processes of the subject disclosure are stored in system memory 1204, permanent storage device 1202, and/or ROM 1210. From these various memory units, processing unit(s) 1212 retrieves instructions to execute and data to process in order to execute the processes of some implementations.

Bus 1208 also connects to input and output device interfaces 1214 and 1206. Input device interface 1214 enables the user to communicate information and select commands to the electronic system. Input devices used with input device interface 1214 include, for example, alphanumeric keyboards and pointing devices (also called "cursor control devices"). Output device interface 1206 enables, for example, the display of images generated by electronic system 1200. Output devices used with output device interface 1206 include, for example, printers and display devices, such as cathode ray tubes (CRT) or liquid crystal displays (LCD). Some implementations include devices such as a touchscreen that functions as both input and output devices.

Finally, as shown in FIG. 12, bus 1208 also couples electronic system 1200 to a network (not shown) through a network interface 1216. In this manner, the computer can be a part of a network of computers (such as a local area network ("LAN"), a wide area network ("WAN"), or an Intranet, or a network of networks, such as the Internet. Any or all components of electronic system 1200 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for ensuring data and computation security, comprising:
    selecting, by a server from of a plurality of trusted control nodes forming a trusted authorization center, a subset of trusted control nodes;
    transmitting, by the server, to each selected trusted control node a service request, wherein the service request includes a first certificate that is bound to a first trusted-computing module associated with the server;
    receiving, by the server from each selected trusted control node a response comprising a second certificate that is bound to a second trusted-computing module associated with the selected trusted control node, thereby facilitating a mutual authentication between the server and each selected trusted control node;
    receiving, by the server from each selected trusted control node, a subkey, wherein the subkey is generated by the selected trusted control node based on: a share of a private key associated with the trusted authorization center, an identity of the server, a unique identifier of the first trusted-computing module associated the server, and platform configuration register (PCR) values of the first trusted-computing module associated with the server; and
    generating, by the server, a server-specific private key based on a set of subkeys received from the selected subset of trusted control nodes of the trusted authorization center.

2. The computer-implemented method of claim 1, wherein the plurality of trusted control nodes forming the trusted control center share the private key using a secret-sharing scheme.

3. The computer-implemented method of claim 1, further comprising:
    establishing a secure communication channel between the server and the trusted authorization center using a quantum key distribution process.

4. The computer-implemented method of claim 1, further comprising:
    generating a trusted certificate based on the server-specific private key; and
    sending the trusted certificate to a client to allow the client to authenticate the server.

5. A server computer, comprising:
    a processor; and
    a storage device coupled to the processor and storing instructions which when executed by the processor cause the processor to perform a method for ensuring data and computation security, wherein the method comprises:

selecting, by the server computer from of a plurality of trusted control nodes forming a trusted authorization center, a subset of trusted control nodes;

transmitting, by the server computer, to each selected trusted control node a service request, wherein the service request includes a first certificate that is bound to a first trusted-computing module associated with the server computer;

receiving, by the server computer from each selected trusted control node a response comprising a second certificate that is bound to a second trusted-computing module associated with the selected trusted control node, thereby facilitating a mutual authentication between the server computer and each selected trusted control node;

receiving, by the server computer from each selected trusted control node, a subkey, wherein the subkey is generated by the selected trusted control node based on: a share of a private key associated with the trusted authorization center, an identity of the server computer, a unique identifier of the first trusted-computing module associated the server computer, and platform configuration register (PCR) values of the first trusted-computing module associated with the server computer; and generating a server-specific private key based on a set of subkeys received from the selected subset of trusted control nodes of the trusted authorization center.

6. The server computer of claim 5, wherein the plurality of trusted control nodes forming the trusted authorization center share the private key using a secret-sharing scheme.

7. The server computer of claim 5, wherein the method further comprises:

generating a trusted certificate based on the server-specific private key; and sending the trusted certificate to a client computer to allow the client computer to authenticate the server computer.

8. A computer-implemented method for receiving a trusted certificate, comprising:

sending, by an entity in a cloud computing environment, a certificate request to a trusted authorization center, wherein the trusted authorization center comprises a set of trusted control nodes that share, using a secret-sharing scheme, a private key associated with the cloud computing environment, wherein each trusted control node is configured to store a share of the private key in a first trusted-computing module associated with the trusted control node, and wherein sending the certificate request comprises selecting a subset of trusted control nodes from the set of trusted control nodes and transmitting a service request to each selected trusted control node, wherein the service request includes a first certificate that is bound to a second trusted-computing module associated with the entity;

receiving, by the entity from each selected trusted control node, a response comprising a second certificate that is bound to the first trusted-computing module associated with the selected trusted control node, thereby facilitating a mutual authentication between the entity and each selected trusted control node;

receiving, from each selected trusted control node, a subkey, wherein the subkey is generated by the trusted control node based on: identity information associated with the entity, a unique identifier of the second trusted-computing module associated with the entity, platform configuration register (PCR) values of the second trusted-computing module, and the share of the private key stored in the first trusted-computing module;

generating an entity-specific private key based on a set of subkeys received from the selected subset of trusted control nodes of the trusted authorization center; and deriving a trusted certificate from the entity-specific private key.

* * * * *